(12) United States Patent  
Asano et al.

(10) Patent No.: US 7,283,633 B2  
(45) Date of Patent: Oct. 16, 2007

(54) INFORMATION RECORDING AND/OR REPRODUCING METHOD AND INFORMATION RECORDING AND/OR REPRODUCING DEVICE

(75) Inventors: Tomoyuki Asano, Kanagawa (JP); Yoshitomo Osawa, Kanagawa (JP); Ryuji Ishiguro, Tokyo (JP); Atsushi Mitsuzawa, Tokyo (JP); Tateo Oishi, Saitama (JP)

(73) Assignee: Sony Corporation (JP)

( * ) Notice: Subject to any disclaimer, the term of this patent is extended or adjusted under 35 U.S.C. 154(b) by 945 days.

(21) Appl. No.: 10/049,434

(22) PCT Filed: Jun. 21, 2001

(86) PCT No.: PCT/JP01/05326

§ 371 (c)(1),  
(2), (4) Date: May 10, 2002

(87) PCT Pub. No.: WO01/99332

PCT Pub. Date: Dec. 27, 2001

(65) Prior Publication Data

US 2002/0150251 A1   Oct. 17, 2002

(30) Foreign Application Priority Data

Jun. 21, 2000   (JP)   ............................ 2000-186174  
Jun. 21, 2000   (JP)   ............................ 2000-186175

(51) Int. Cl.  
*H04L 9/00*   (2006.01)

(52) U.S. Cl. ........................................ 380/281; 380/45

(58) Field of Classification Search ................ None  
See application file for complete search history.

(56) References Cited

U.S. PATENT DOCUMENTS 5,796,839 A   8/1998   Ishiguro (Continued)

FOREIGN PATENT DOCUMENTS

DE   19511298 A1   10/1996

(Continued)

OTHER PUBLICATIONS

Waldvogel, M. et al., "The VersaKey Framework: Versatile Group Key Management", IEEE Journal on Selected Areas in Communications, Sep. 1999, vol. 17, No. 9, pp. 1614 to 1631.

(Continued)

*Primary Examiner*—Gilberto Barron, Jr.  
*Assistant Examiner*—Minh Dinh  
(74) *Attorney, Agent, or Firm*—Lerner, David, Littenberg, Krumholz & Mentlik, LLP

(57) ABSTRACT

An information reproducing method and an information reproducing device in which the key renewal block (KRB) of the latest version is selectively used to encrypt the content to store the encrypted contents in a recording medium. A plural number of KRBs of different generations and versions are stored in a recording medium. If the latest KRB is detected, it is stored in a memory unit within the recording and/or reproducing device. A plural number of KRBs having plural different generations or versions are stored on the recording medium. With the present method and device, in storing the content in the recording medium, the latest usable one of the KRB in the memory unit of the reproducing device and plural KRBs on the recording medium is detected to acquire an encrypting key, such as a media key, to execute the content encryption. In this manner, the encrypted content based on a KRB of a newer version can at all times be stored on the recording medium.

27 Claims, 27 Drawing Sheets

U.S. PATENT DOCUMENTS

| | | | |
|---|---|---|---|
| 5,974,140 A | 10/1999 | Tanaka | |
| 6,049,878 A * | 4/2000 | Caronni et al. | 726/3 |
| 6,609,116 B1 * | 8/2003 | Lotspiech | 705/57 |
| 6,832,319 B1 * | 12/2004 | Bell et al. | 713/193 |
| 7,010,125 B2 * | 3/2006 | Lotspiech et al. | 380/242 |
| 7,013,010 B2 * | 3/2006 | Ripley | 380/201 |
| 7,039,803 B2 * | 5/2006 | Lotspiech et al. | 713/163 |

FOREIGN PATENT DOCUMENTS

| | | |
|---|---|---|
| EP | 1 008 989 A2 | 6/2000 |
| EP | 1 185 022 A1 | 3/2002 |
| JP | 10-003256 | 1/1998 |
| JP | 10-3256 A1 | 1/1998 |
| JP | 10-293726 A1 | 11/1998 |
| JP | 11-39795 A1 | 2/1999 |
| JP | 11-126425 A1 | 5/1999 |
| JP | 01-187013 | 7/1999 |
| JP | 11-187013 A1 | 7/1999 |
| JP | 11-250570 A1 | 9/1999 |
| JP | 11-250571 A1 | 9/1999 |
| JP | 2000-163882 A2 | 6/2000 |

OTHER PUBLICATIONS

Wong, C. K. et al., "Secure Group Communications Using Key Graphs", In: Proceedings of ACM SIGCOMM'98, (1998), pp. 68 to 79, (http://www.acm.org/sigcomm/sigcomm98/tp/technical.html).

"5C Digital Transmission Content Protection White Paper", Revision 1.0, (1998), pp. 1-13 (http://www.dtcp.com).

Makoto Tatebayashi et al., Kiroku Media no Contents Hogo System, 2000 nen Denshi Joho Tsuushin Gakkai Kiso Kyokai Society Taikai Kouen Ronbunshuu, Sep. 7, 2000, pp. 367 to 368.

Supplementary EP Search Report.

Wallner, D. et al., "Key Management for Multicast: Issues and Architectures," Nat'l Security Agency, Jul. 1, 1997; http://tools.ietf.org/htm/draft-wallner-key-arch-00.

* cited by examiner

KRB : Key Renewal Block INSTANCE 1
SEND ROOT KEY K(t)R AT TIME t TO DEVICES 0, 1, 2

| GENERATION : t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG.5A

KRB : Key Renewal Block INSTANCE 2
SEND ROOT KEY K(t)R AT TIME t TO DEVICES 0, 1, 2

| GENERATION : t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG.5B

INSTANCE 1
INSTANCE OF GENERATING DISC NATIVE KEY
INPUT
MEDIUM KEY (64bits)
DISC ID (64bits)
OUTPUT
DISC NATIVE KEY (64bits)
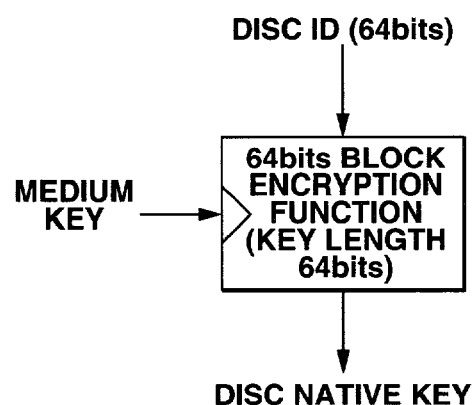
INSTANCE 2
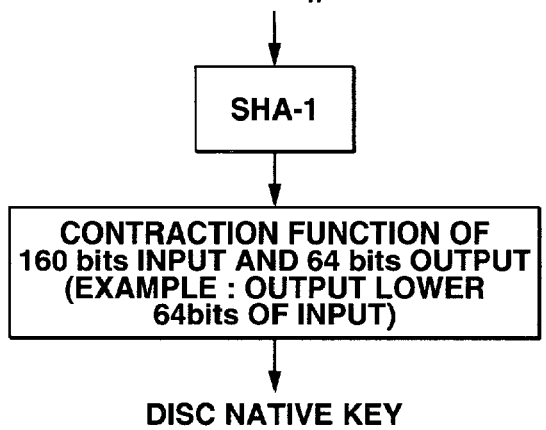
FIG.8

INSTANCE 1
INSTANCE OF GENERATING OF BLOCK KEY
INPUT
BLOCK SEED (32bits)
TITLE NATIVE KEY (64bits)
OUTPUT
BLOCK KEY (64bits)
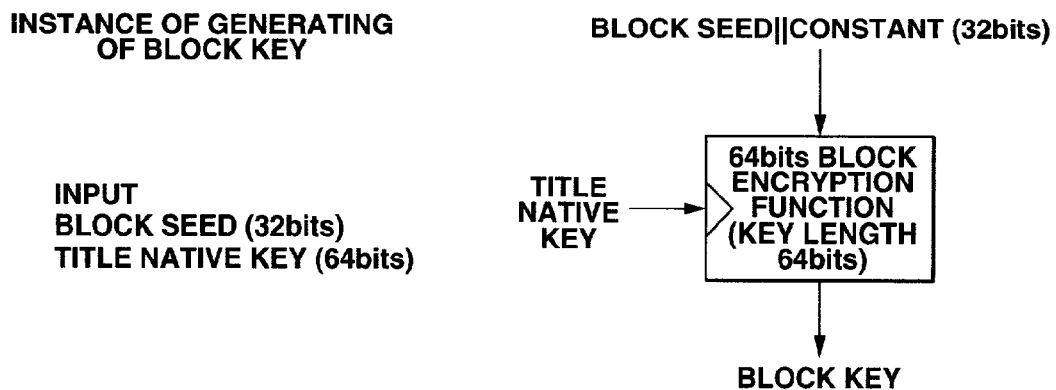
INSTANCE 2
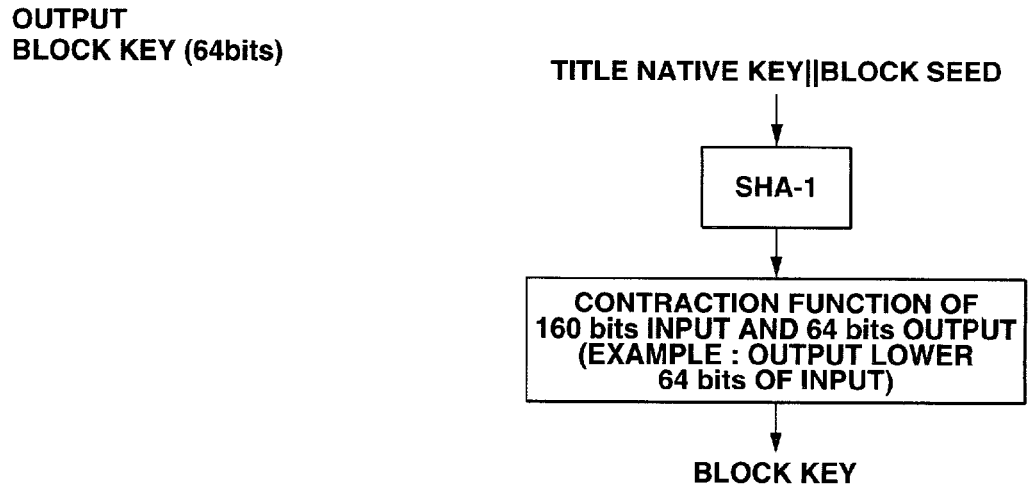
FIG.10

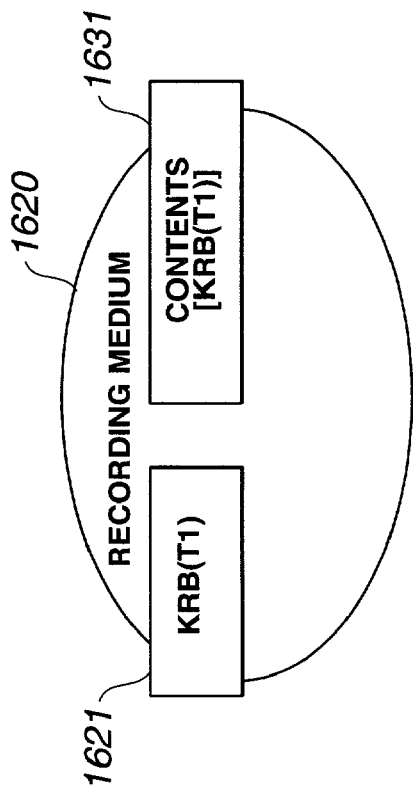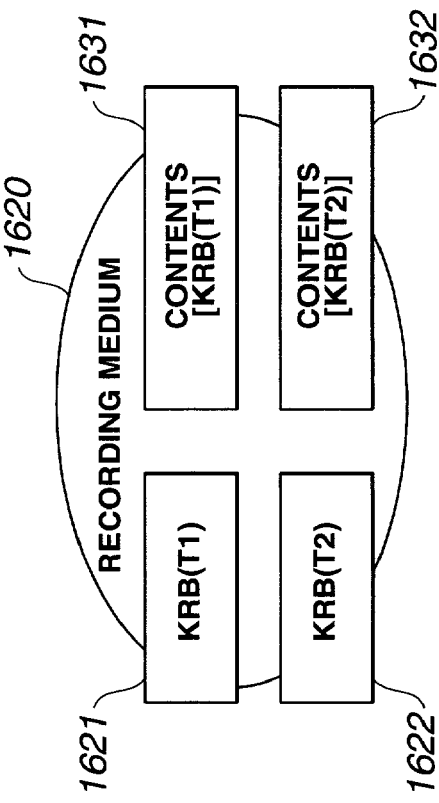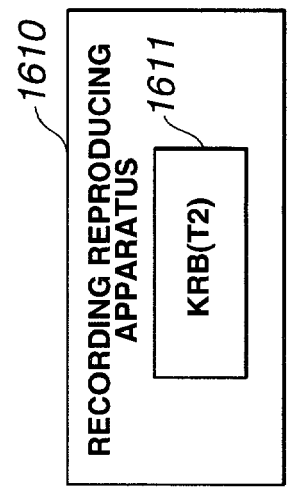
FIG.16A
FIG.16B

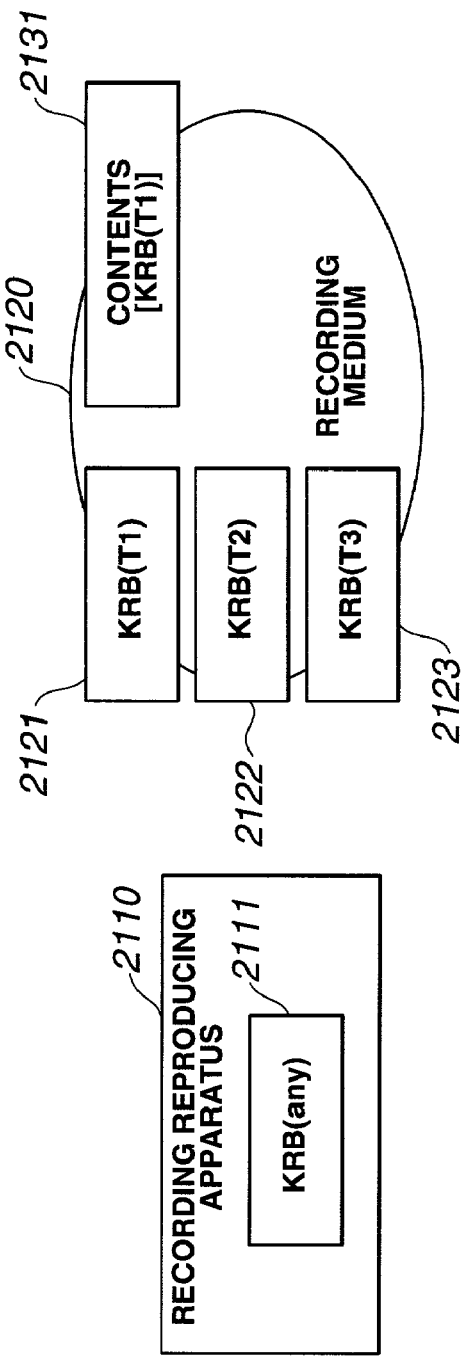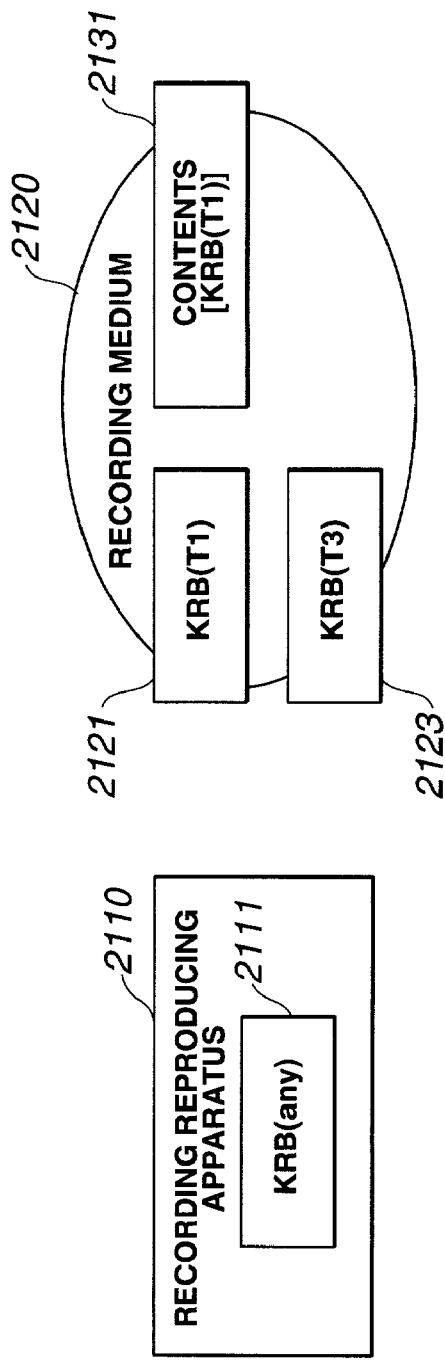
FIG.21A
FIG.21B

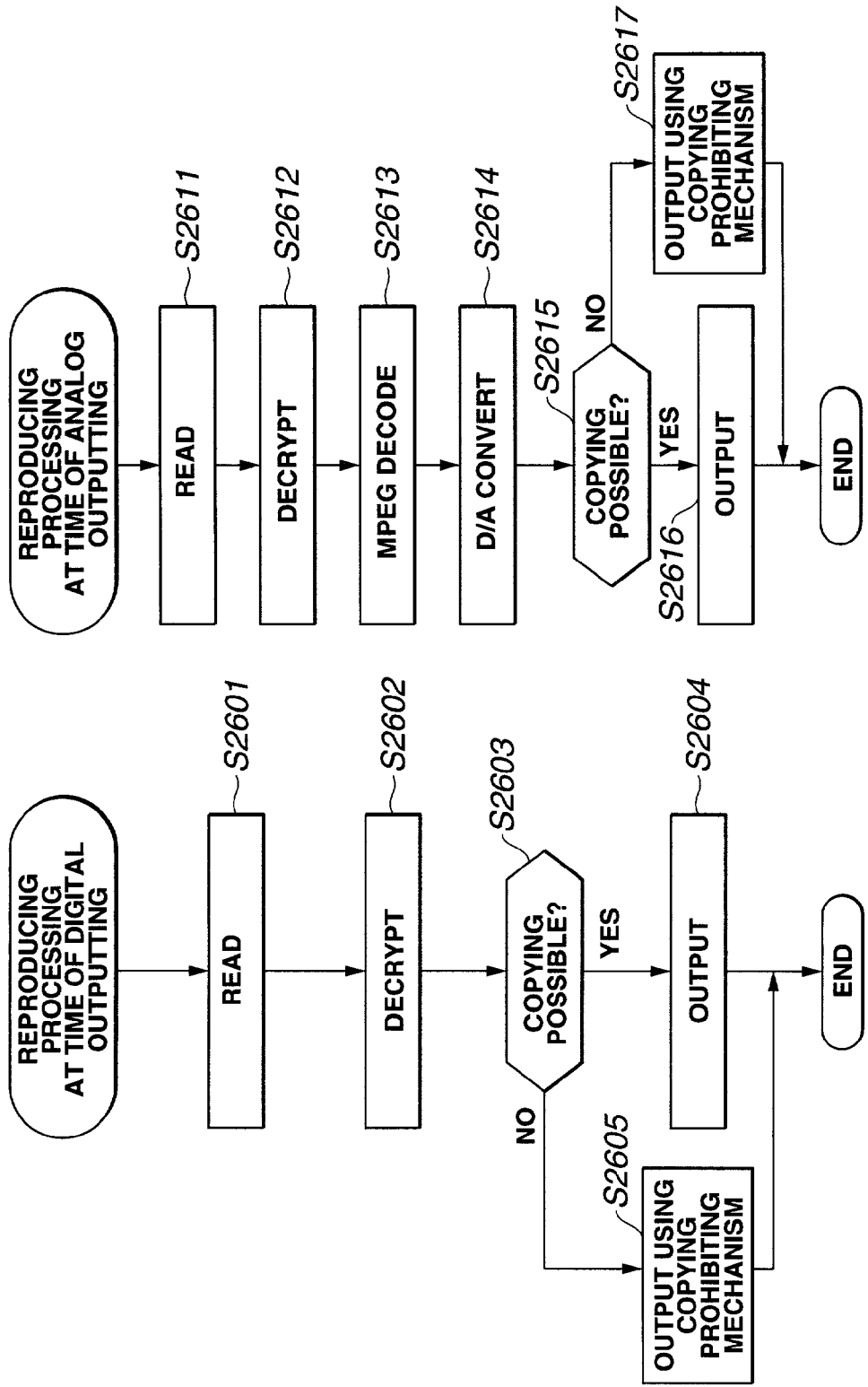

INFORMATION RECORDING AND/OR REPRODUCING METHOD AND INFORMATION RECORDING AND/OR REPRODUCING DEVICE

TECHNICAL FIELD

This invention relates to an information recording device, an information reproducing device, an information recording method, an information reproducing method, an encrypting key renewal method, an information recording medium and a computer program. More particularly, it relates to configuration in which a cipher key, such as a master key or a media key, is renewed using a hierarchical key distribution system of a tree structure, and in which the content newly stored on a recording medium can be encrypted using a newer key.

BACKGROUND ART

In keeping up with progress and development of digital signal processing techniques, recording devices or recording media for digitally recording the information, are finding widespread use. With the digital recording device or recording medium, since copying can be repeatedly made without degrading the sound or picture quality, recording media obtained on unauthorized duplication may be circulated on the market, thus impairing the benefit of the copyright owners or authorized distributers of various content items, such as music or motion pictures. Nowadays, various techniques or systems for preventing unauthorized duplication have been introduced in the digital recording devices or digital recording media in order to prohibit such unauthorized duplication of digital data.

For example, in a MD (mini-disc), MD being a trademark, an SCMS (Serial Copy Management System) is used as a method of prohibiting unauthorized duplication. The SCMS is such a system in which, on the data reproducing side, an SCMS signal is output along with audio data from a digital interface (DIF) and, on the receiving side, the recording of audio data from the reproducing side is controlled based on the SCMS signal from the reproducing side to prohibit the unauthorized duplication.

Specifically, the SCMS signal is such a signal indicating whether given audio data is copy-free data, for which copying can be made any number of times, copy-once-allowed data, for which copying is allowed only once, or copy-prohibited data, for which copying is prohibited. On receipt of audio data from the DIF, the data recording side detects the SCMS signal, sent along with the audio data. If the SCMS signal is copy-free, the audio data is recorded, along with the SCMS signals, on a mini-disc. If the SCMS signal is copy-once-allowed, the SCMS signal is changed to copy-prohibited and is recorded along with the audio data on the mini-disc. If the SCMS signal is copy-prohibited, audio data is not recorded. By this control employing the SCMS, unauthorized duplication of audio data, protected by copyright, may be prevented from occurring.

With the SCMS, it is prerequisite that the data recording equipment itself owns the structure of controlling the recording of the audio data from the reproducing side, based on the SCMS signals, as described above. Thus, if the mini-disc not having the structure of executing the SCMS control is produced, it is difficult to cope with the illicit copying. So, the DVD player, for example, is configured for prohibiting illicit copying of copyright-protected data by exploiting a content scramble system.

In the content scramble system, video or audio data are recorded encrypted in a DVD-ROM(Read Only Memory), and a key used for decoding the encrypted data (decrypting key) is given a licenced DVD player. It is a DVD player, designed to comply with preset operational regulations, such as not undertaking illicit copying, that is licensed. So, the licenced DVD player is able to reproduce the pictures or speech from the DVD-ROM by decoding the encrypted data, recorded on the DVD-ROM, by exploiting the accorded key.

On the other hand, an unlicenced DVD player, not having a key for decoding the encrypted data, is unable to decode the encrypted data recorded on the DVD-ROM. Thus, with the content scramble system configuration, a DVD player not meeting required conditions at the licencing time cannot reproduce the DVD-ROM having digital data recorded thereon, thus prohibiting unauthorized duplication.

However, the content scramble system, used in the DVD-ROM, is designed for a recording medium on which data writing by the user is impossible (this sort of the recording medium is incidentally referred to below as ROM media), while account is not taken of application thereof to a recording medium on which data writing by the user is possible (this sort of the recording medium is incidentally referred to below as RAM media).

That is, if the data recorded on the ROM media is encrypted, but the encrypted data is copied in its entirety on the RAM media, the result is a so-called pirate edition reproducible on a licenced authorized device.

The present Assignee proposed in our senior patent application (Japanese Laying-Open Patent Publication H-11-224461; JP Patent Application 10-25310) a configuration in which the information for identification of individual recording media, referred to below as medium identification information, is recorded along with other data on a recording medium in question to permit only the licenced authentic device to access the medium identification information of the recording medium.

With this method, data on the recording medium is encrypted by the media identification information and a secret key (master key), obtained on licencing, such that, if an unlicenced device or equipment reads out the encrypted data, no meaningful data can be produced. It is noted that the device has its operation regulated at the time of licencing so that illicit duplication (unauthorized copying) is prohibited.

An unlicenced device cannot access the media identification information, while the medium identification information is of a value specific to each medium, so that, even if such unlicenced device duplicates the totality of the encrypted data, recorded on the recording medium, on a new recording medium, the data recorded on the so produced recording medium cannot be decrypted correctly on a licenced device, to say nothing of the unlicenced device, thus effectively prohibiting the unauthorized duplication.

Meanwhile, in the above configuration, a master key stored in a licenced device or equipment is usually common to all devices or equipment. The reason the master key common to the plural equipment is stored is that this represents an essential condition in order to make the media recorded on a given equipment reproducible on other equipment, that is to assure interoperability.

If, in such system, a hacker has succeeded in aggressing an equipment and has taken out the master key, the data recorded encrypted can be decrypted in the entire system, thus leading to breakdown of the entire system. In order to prevent this from occurring, it is essential that, if it is revealed that a given equipment is attacked and a master key has become explicit, the master key be changed to a new one, which then is given the totality of the equipment except the equipment which has succumbed to the attack. As the simplest system to realize this configuration, a key unique to each equipment (device key) may be given each equipment and a value obtained on encrypting the new master key with the individual device key may then be formed and transmitted to each equipment through a recording medium. However, in this case, the volume of the entire messages to be transmitted is undesirably increased in proportion to the number of the equipment.

As the configuration, intended to overcome such problem, the present Assignee has already proposed in our co-pending patent application (JP Patent Application 2000-105328) a configuration employing a key distribution method having respective information reproducing devices arranged at respective leaves of an n-branched tree, in which a key necessary for recording the content data on a recording medium or reproduction from the recording medium (master key or media key) is distributed through a recording medium or over a communication network, each equipment then undertaking the recording or reproduction of the content data using the so distributed master key or media key to enable the key to be distributed to authorized equipment (equipment in which secrecy is not disclosed) with a lesser message volume. Specifically, a key required in generating a key required for recording on a recording medium or reproduction from the recording medium, for example, a node key allocated to each leaf or node of an n-branched tree, is set as a renewal node key. The renewal node key is encrypted such that decryption is possible with a leaf key or a node key owned solely by the authorized equipment, and the resulting encrypted information is included in a key renewal block (KRB) which is then distributed to each information recording and/or reproducing equipment. On receipt of the key renewal block (KRB), each recording and/or reproducing equipment executes KRB decrypting processing to acquire the key necessary in recording or reproduction on or from the recording medium.

The aforementioned structure has a feature that, if it is revealed that a given device in a specified system (group or set of recording and/or reproducing devices) is attacked by a hacker and a device key as the secrecy of the device has become disclosed, the recording and/or reproducing device, the secrecy of which as become disclosed, is excluded from the system, that is the recording and/or reproducing interoperability between the device thus excluded from the system and the devices not excluded from the system is disabled, insofar as recording media manufactured since that time is concerned.

In this system, there is presented a problem that an equipment the secrecy of which has become disclosed can be excluded from the system only insofar as recording media manufactured since that time is concerned, whereas data recorded on a recording medium manufactured prior to the time of such disclosure can be decrypted using the so disclosed key even although the actual data recording time is posterior to the time of such disclosure, that is, there may be occasions where the device to be excluded cannot actually be excluded.

In view of the above-described status of the art, it is an object of the present invention to provide a information recording devices, an information reproducing device, an information recording method, an information reproducing method, a cipher key renewal method, an information recording medium and a computer program, in which, after it is revealed that secrecy has become disclosed, recording media produced prior to such disclosure cannot be decrypted using the disclosed key to enable more effective encryption of content.

DISCLOSURE OF THE INVENTION

The present invention overcomes the aforementioned problems, and aims to provide an information recording device, an information reproducing device, an information recording method, an information reproducing method, an encrypting key renewal method, an information recording medium and a computer program, in which, if it is revealed that secrecy has become disclosed, recording media produced before the time of such disclosure is adapted to be not decryptable with the disclosed key to enable more effective contents decryption.

To this end, the present invention provides an information recording device for recording the information on a recording medium, including memory means for holding a node key unique to each node of a hierarchical tree structure having a plural number of such information recording devices, operating as leaves, and a leaf key unique to each information recording device, the memory means also holding a key renewal block formed as renewal key storage data decryptable using at least one of the node key and the leaf key, and encryption means for decrypting the key renewal block decryptable using at least one of the node key and the leaf key provided in the information recording device to calculate an encrypting key used in encrypting data to be stored in the recording medium, the encryption means encrypting the data to be stored in the recording medium using the calculated encrypting key , The encryption means detects, in encrypting and storing the content for the recording medium, the latest usable key renewal block from key renewal blocks stored in the recording medium and from the key renewal block stored in the memory means of the information recording device itself, the encryption means encrypting the data to be stored on the recording medium using the encrypting key obtained on decrypting the detected latest usable key renewal block.

The present invention also provides an information reproducing device for reproducing the information from a recording medium, including memory means for holding a node key unique to each node of a hierarchical tree structure having a plural number of such information reproducing devices operating as leaves, and a leaf key unique to each information reproducing device, the memory means also holding key renewal blocks each formed as renewal key storage data decryptable using at least one of the node key and the leaf key, and encryption means for decrypting the key renewal block decryptable using at least one of the node key and the leaf key provided in the information reproducing device to calculate an encrypting key used for decrypting the cipher data stored in the recording medium. The encryption means decrypts the cipher data stored in the recording medium using the calculated encryption key. The encryption means detects, in the processing of decrypting the cipher data stored in the recording medium, the one of the key renewal block stored in the recording medium and the key renewal block stored in the memory means of the reproducing device itself, which has a version coincident with the version of the encrypting key of the content to be reproduced. The encryption means executes the decrypting processing of the cipher data stored on the recording medium using the encrypting key obtained by the processing of decrypting the detected key renewal block.

The present invention also provides an information recording method in an information recording device adapted for recording the information for a recording medium, the information recording device holding a node key unique to each node of a hierarchical tree structure having a plural number of such information recording devices, operating as leaves, and a leaf key unique to each information recording device, in which the method includes a step of detecting the latest usable one of the key renewal blocks stored in the recording medium and the key renewal block stored in the memory means of the information recording device itself, a step of decrypting the detected latest usable key renewal block, at the detection step, using at least the node key or the leaf key held in the information recording device, to calculate the encrypting key used in encrypting the data stored in the recording medium, and a step of encrypting the recording data for the recording medium, using the calculated encrypting key, to store the encrypted data on the recording medium.

The present invention also provides an information reproducing method in an information recording device adapted for recording the information for a recording medium, each of a plurality of such devices holding a node key unique to each node of a hierarchical tree structure having the plural respective information recording devices operating as leaves, and a leaf key unique to each information reproducing device, in which the method includes a step of acquiring the version information of an encrypting key for the content being reproduced, stored in a recording medium, a step of detecting the one of the key renewal block stored in the recording medium and the key renewal block stored in a memory means of the reproducing device itself, which has a version coincident with the version of the encrypting key of the content to be reproduced, a step of generating an encrypting key by decryption processing of a key renewal block as detected by the detection step, and a step of decrypting the cipher data stored in the recording medium using the generated encrypting key.

The present invention also provides an information recording medium capable of recording the information, the recording medium having stored therein, as key renewal blocks having different configurations, a plural number of key renewal blocks, each obtained on encrypting a renewal node key contained in each node key unique to each node forming a hierarchical tree structure having a plural number of information recording or reproducing devices operating as leaves, and a leaf key unique to each information recording or reproducing device, using a key including at least a leaf key or a node key of a lower layer.

The present invention provides a computer program for executing on a computer system the information recording processing in an information recording device which holds a node key unique to each node forming a hierarchical tree structure having plural such information recording devices, operating as leaves, and a leaf key unique to each information recording device, and which records the information on a recording medium, in which the program includes a detecting step of detecting the latest usable key renewal block from the key renewal blocks stored in the recording medium and the key renewal block stored in the memory means of the information recording device itself, a decrypting step of decrypting the detected latest usable key renewal block at the detecting step using at least one of the node key and the leaf key provided in the information recording device, to calculate the encrypting key used in encrypting the data stored on the recording medium and a step of encrypting the recording data for the recording medium using the encrypting key as found in the decrypting step to store the encrypted recording data on the recording medium.

The present invention also provides a computer program for executing on a computer system the information reproducing processing in an information reproducing device holding a node key unique to each node forming a hierarchical tree structure having the plural such information reproducing devices operating as leaves, and a leaf key unique to each information reproducing device, and which decrypts the cipher data stored in the recording medium, in which the program includes a step of acquiring the version information of an encrypting key of the content to be reproduced, stored on a recording medium, a step of detecting a key renewal block having a version coincident with the version of the encrypting key of the content to be reproduced, from the key renewal blocks stored in the recording medium and the key renewal block stored in the memory means of the information recording device itself, a step of generating an encrypting key by decryption processing of the key renewal block detected in the detecting step and a step of decrypting the cipher data stored on the recording medium using the generated encrypting key.

The present invention also provides an information recording device for recording the information on a recording medium, each recording device including memory means for holding a node key unique to each node of a hierarchical tree structure having a plural number of such information recording devices operating as leaves and a leaf key unique to each information recording device, the memory means also holding a key renewal block each formed as renewal key storage data decryptable using at least one of the node key and the leaf key, encryption means for decrypting the key renewal block formed as renewal key storage data decryptable using at least one of the node key and the leaf key provided in the information recording device to calculate an encrypting key used in encrypting the data to be stored in the recording medium, the encryption means encrypting the data stored in the recording medium using the calculated encrypting key, and renewing means for comparing, in accessing the recording medium, the version of a key renewal block stored in the recording medium to that of the key renewal block owned by the information recording device itself, and for writing the key renewal block of the new version on the recording medium if the key renewal block of the new version is the key renewal block stored in the memory means of the recording device itself, and the key renewal block of the new version is not as yet stored on the recording medium.

The present invention also provides an information reproducing device for reproducing the information from a recording medium, each information reproducing device including memory means for holding a node key unique to each node of a hierarchical tree structure having a plural number of such information reproducing devices operating as leaves and a leaf key unique to each information reproducing device, the memory means also holding a key renewal blocks formed as renewal key storage data decryptable using at least one of the node key and the leaf key, encryption means for decrypting the key renewal block decryptable using at least one of the node key and the leaf key provided in each information reproducing device to calculate an encrypting key used in encrypting data to be stored in the recording medium, the encryption means decrypting the data stored in the recording medium, using the calculated encrypting key, and renewal means for comparing, in accessing the recording medium, the version of a key renewal block stored in the recording medium to that of the key renewal block owned by the reproducing device itself, and for writing the key renewal block of the new version in the recording medium, if the key renewal block of the new version is the key renewal block stored in the memory means of reproducing device itself, and the key renewal block of the new version is not as yet stored on the recording medium.

The present invention also provides, for use in a recording or reproducing device for recording the information on a recording medium including a node key unique to each node forming a hierarchical tree structure having a plural number of such information recording devices, operating as leaves, and a leaf key unique to each recording device, a method for renewing an encrypting key including a detection step of detecting the latest usable one of the key renewal blocks stored on the recording medium and the key renewal block stored in the memory means of the recording or reproducing device, and a renewal step of undertaking, in case the latest version of the key renewal block is the key renewal block stored in the memory means of the information recording or reproducing device itself and the key renewal block of the new version has not been stored on the recording medium, the writing of the key renewal block of the new version on the recording medium.

The present invention also provides a computer program for having a computer system execute encryption key renewal processing in an information recording or reproducing device for recording or reproducing the information for a recording medium, holding a node key unique to each node forming a hierarchical tree structure having a plural number of information recording devices operating as leaves, and a leaf key unique to each information recording device, in which the computer program includes a detection step of detecting the latest usable key renewal block of the new version of the key renewal blocks stored on the recording medium and the key renewal block stored in the memory means of the recording or reproducing device itself, and a renewal step of undertaking, in case the latest version of the key renewal block is the key renewal block stored in a memory means of the information recording or reproducing device itself and the key renewal block of the new version has not been stored on the recording medium, the writing of the key renewal block of the new version on the recording medium.

In the configuration of the present invention, the volume of the messages for distribution necessary for key renewal is suppressed to a small value by employing a hierarchical key distribution system of a tree structure. That is, the key distribution method of a configuration having respective equipment arranged at respective leaves of the n-branched tree is used. The key necessary for recording and/or reproducing the content data for a recording medium, such as a master key or a media key, is distributed over a recording medium or a communication network, and used by respective equipment for recording and/or reproducing the content data.

The present invention provides a configuration in which, for overcoming the aforementioned problem, plural media keys can be set instead of setting a sole media key for each recording medium. That is, even after a recording medium is manufactured and presented to the market, the recording or the reproducing device is enabled to write a key renewal block (KRB) for calculating a newer media key on the recording medium. In recording the data on the recording medium, the recording or reproducing device calculates the media key, using the latest one of the key renewal blocks (KRBs) on the recording medium and the KRB stored in itself to use it for encrypting the data. If the latest KRB is stored not on the recording medium but on the device itself, the device stores it on the recording medium.

Additionally, the recording or reproducing device checks the versions of the entire KRBs on the recording medium in accessing the recording medium and, if the latest KRB is newer than the KRB stored on itself, it substitutes the latest KRB for the KRB it has stored, by way of KRB renewal. By this processing, new recording media may be stored in the recording and/or reproducing device one after another and, in recording the data, the data are encrypted and recorded using media keys calculated by the latest KRB stored then in the recording and/or reproducing device and in the recording medium, so that, in recording the data on the recording medium, the recording or reproducing device calculates the media key, using the latest one of the key renewal blocks (KRBs) on the recording medium and the KRB stored in itself to use it for encrypting the data. If the latest KRB is stored not on the recording medium but on itself, the device stores it on the recording medium. Even granting that the recording medium was produced at a remote past time point, with the KRB pre-stored on the recording medium being extremely old, or the KRB stored in the recording and/or reproducing device is also old, the probability is high that a new KRB be used at data recording time, thus assuring higher data security.

Also, the present invention provides a configuration in which, for overcoming the aforementioned problem, keys of plural generations and different versions can be stored in the recording medium, so that, when the recording and/or reproducing device accesses the recording medium, newer keys can be stored on the recording medium, while unneeded keys are deleted. In recording the data on the recording medium, the recording or reproducing device calculates the media key, using the latest one of the key renewal block (KRB) stored on the recording medium and the KRB stored in itself, to use it for encrypting the data. If the latest KRB is stored not on the recording medium but on itself, the device stores it on the recording medium.

Moreover, according to the recording and/or reproducing device according to the present invention, new KRBs are recorded on the recording medium not only when contents data are recorded but also when the recording medium is loaded on the recording and/or reproducing device and when the recording and/or reproducing device accesses the recording medium. By so doing, a recording and/or reproducing device having a KRB newer than the entire KRBs stored on the recording medium is able to record a new KRB on the recording medium even when not recording contents data thus raising the speed of migration of the new KRBs. Although it may be contemplated that one or more KRBs other than the latest KRB on the recording medium be left on the recording medium, such KRB(s) may be erased to save the recording capacity of the recording medium.

Meanwhile, the program furnishing medium according to the present invention is a medium for furnishing a computer program, in a computer readable form, to a general-purpose computer system capable of executing a variety of program codes. There is no particular limitation to the configuration of the media, including recording media, such as CD, FD or MO, or to the transmission medium, such as networks.

The program furnishing medium gives a definition of the relationship as to structural or functional cooperation between the computer program and the furnishing medium in implementing the functions of the preset computer program on a computer system. Stated differently, by installing the computer program on the computer system through the furnishing medium, cooperative actions can be realized on the computer system to realize the operations and effect similar to the other aspects of the present invention.

Other objects, features and advantages of the present invention will become more apparent from reading the embodiments of the present invention with reference to the drawings.

BRIEF DESCRIPTION OF THE DRAWINGS

FIGS. 5A and 5B show an instance of a key renewal block (KRB) used for distributing media keys to the recording and/or reproducing device according to the present invention.

FIG. 8 illustrates the generation of a key unique to a disc, usable in the information recording and/or reproducing device according to the present invention.

FIG. 10 shows an instance of generating and a block key, usable in the information recording and/or reproducing device according to the present invention.

FIGS. 16A and 16B illustrate a recording medium holding a plural number of the key renewal blocks (KRBs) in the information recording and/or reproducing device of the present invention and storage processing of content encrypted by a key acquired using the latest key renewal block (KRB).

FIGS. 21A and 21B illustrate the processing of deleting the key renewal block (KRB) stored in the recording medium in the recording and/or reproducing device according to the present invention.

FIGS. 26A and 26B are flowcharts for illustrating the data reproducing processing and the copying controlling processing in the recording and/or reproducing device according to the present invention.

BEST MODE FOR CARRYING OUT THE INVENTION

Figure 1:
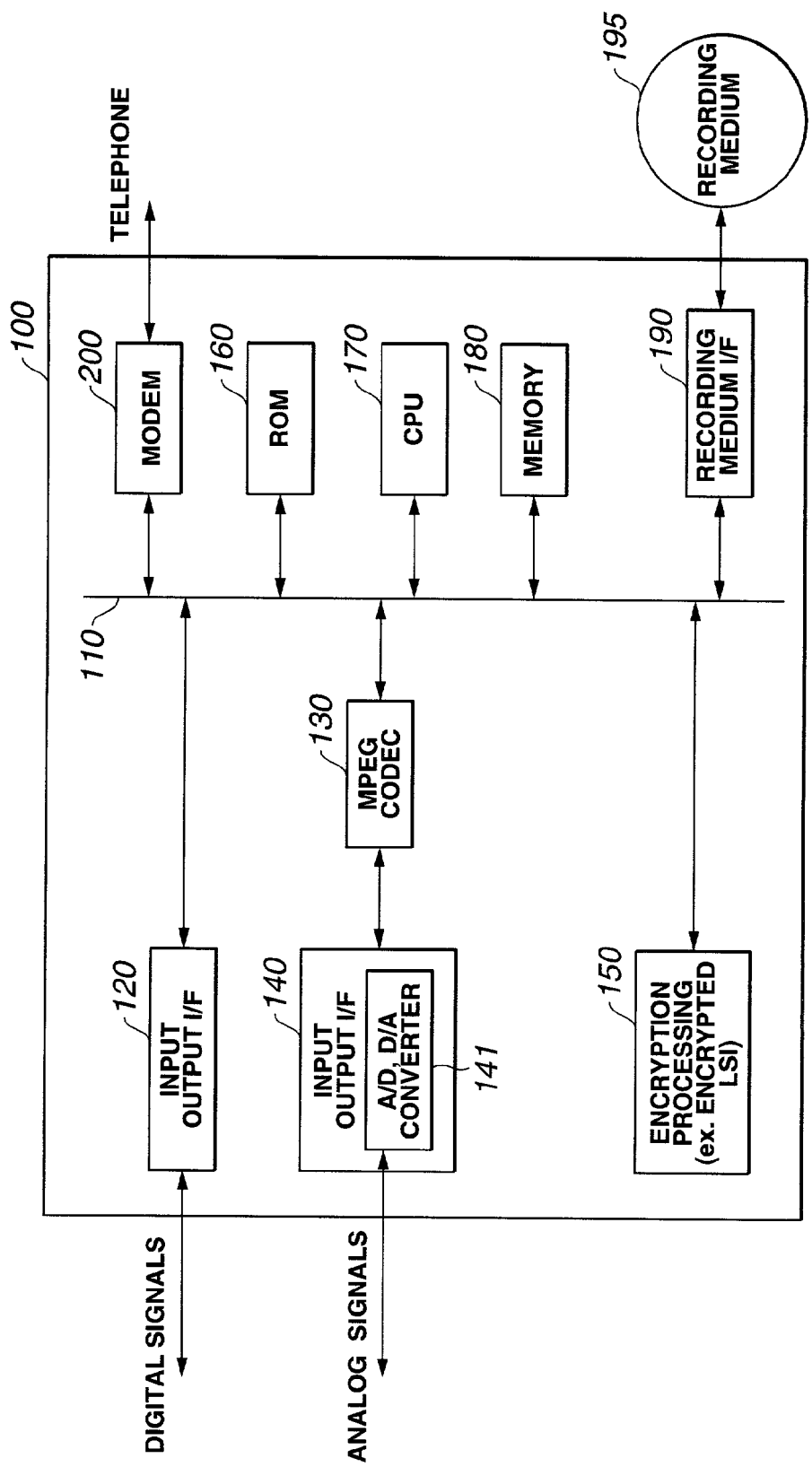
FIG. 1 is a block diagram showing an illustrative structure of an information recording and/or reproducing device of the present invention.

Referring to the drawings, the present invention is now explained in detail.

FIG. 1 is a block diagram showing the structure of an embodiment of a recording and/or reproducing device 100 according to the present invention. The recording and/or reproducing device 100 includes an input/output I/F (interface) 120, an MPEG (Moving Picture Experts Group) codec 130, an input/output I/F (interface) 140 inclusive of an A/D and D/A converter 141, encryption processing means 150, a ROM (read-only memory) 160, a CPU (central processing unit) 170, a memory 180 and a recording medium interface (I/F) 190 for a recording medium 195. These units are interconnected over a bus 110.

The input/output I/F 120 receives digital signals forming various content, such as pictures, speech or programs, supplied from outside, to output the received signals over the bus 110. The input/output I/F 120 also receives digital signals over the bus 110 to output the signals to outside. The MPEG codec 130 MPEG-decodes the MPEG-encoded data, supplied over the bus 110, to output the decoded data to the input/output I/F 140, while MPEG-encoding digital signals supplied from the input/output I/F 140 to output the encoded signals over the bus 110. The input/output I/F 140 includes an A/D-D/A converter 141. The input/output I/F 140 receives analog signals, as content, supplied from outside, to A/D (analog/digital) convert the received analog signals into digital signals, which are output at the MPEG codec 130. The input/output I/F 140 also D/A (digital/analog) converts digital signals from the MPEG codes 130 by the A/D-D/A converter 141 into analog signals which are output to outside.

The encryption processing means 150 is formed by, for example, a one-chip LSI (large scale integrated circuit), and encrypts or decrypts the digital signals, as content, supplied over the bus 110, to output the resulting data again over the bus 110. Meanwhile, the encryption processing means 150 is not limited to a one-chip LSI but may also be formed by various software and hardware combined together. The configuration as processing means by the software configuration will be explained subsequently.

The ROM 160 memorizes a leaf keys, as device key inherent to each of plural recording and/or reproducing devices or to each of plural groups of recording and/or reproducing devices, and a node key as a device key co-owned by plural recording and/or reproducing devices or by plural groups of recording and/or reproducing device. The CPU 170 executes programs stored in a memory 180 to control e.g., the MPEG codec 130 and the encryption processing means 150. The memory 180 is e.g., a non-volatile memory for storing programs run by the CPU 170 or data required for operation of the CPU 170. The recording medium interface 190 drives a recording medium 195, capable of recording and/or reproducing digital data, to read out or reproduce digital data from the recording medium 195 to output the so read-out digital data over the bus 110. The recording medium interface 190 also furnishes the digital data, provided over the bus 110, to the recording medium 195 for recording thereon. Meanwhile, the program and the device key may also be stored in the ROM 160 and in the memory 180, respectively.

The recording medium 195 is a medium capable of memorizing digital data, including optical discs, such as DVD or CD, magneto-optical disc, magnetic disc, magnetic tape or a semiconductor memory, such as RAM. In the present embodiment, the recording medium 195 is removable with respect to the recording medium interface 190. The recording medium 195 may also be enclosed in the recording and/or reproducing device 100.

Figure 2A:
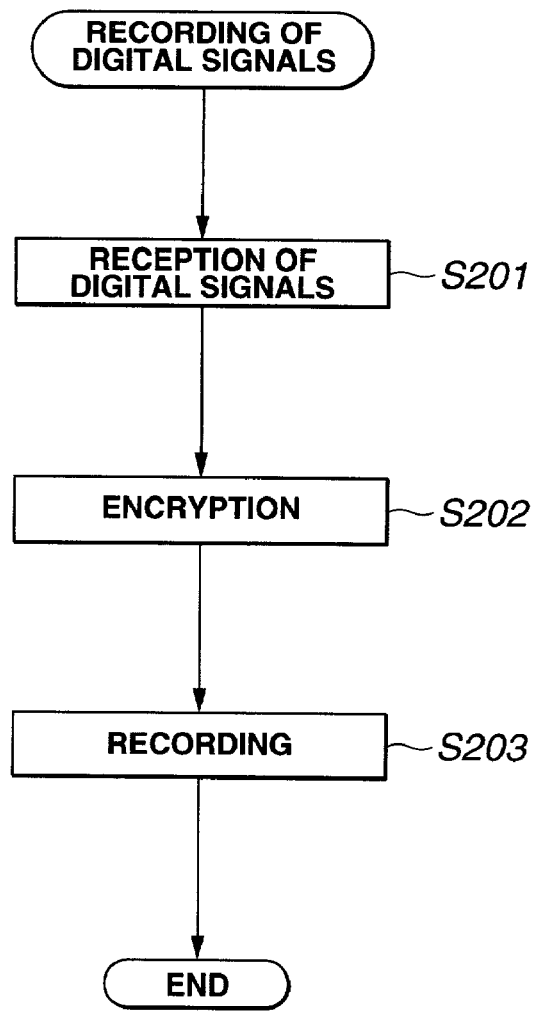
FIGS. 2A and 2B show data recording processing flow of the information recording and/or reproducing device of the present invention.

Referring to the flowcharts of FIGS. 2A, 2B, 3A and 3B, the data recording processing on the recording medium and the data reproducing processing from the recording medium, in the recording and/or reproducing device of FIG. 1, are hereinafter explained. In recording the content of digital signals from outside on the recording medium 195, the recording processing in accordance with the flowchart of FIG. 2A is performed. That is, when the content of digital signals (digital content) are sent e.g. over an IEEE (Institute of Electrical and Electronics Engineers) 1394 serial bus to the input/output I/F 120, the input/output I/F 120 at step S201 receives the digital content, supplied thereto, to output the received digital content over the bus 110 to the encryption processing means 150.

The encryption processing means 150 at step S202 executes the encryption processing on the digital content received to output the resulting encrypted content over the bus 110 to the recording medium interface 190. The encrypted content is recorded via recording medium interface 190 on the recording medium 195 (S203) to terminate the recording processing.

As the standard for protection of digital content in case of transmitting the digital content between equipment interconnected over IEEE1394 serial bus, 5CDTCP (Five Company Digital Transmission Content Protection), incidentally referred to as DTCP, is provided by five companies inclusive of the Assignee company (SONY Corporation). In this DTCP, when non-copy-free digital content is transmitted between different devices, reciprocal authentication is performed prior to data transmission to check as to whether or not the copy control information, used for copy control, can be handled correctly. The transmission side then encrypts the digital content and sends the so encrypted content, with the receipt side then decrypting the encrypted digital content (encrypted content).

In data transmission and reception, based on the DTCP standard, the input/output I/F 120 on the data receipt side at step S201 receives the encrypted content over the IEEE1394 serial bus to decrypt the encrypted content in accordance with the DTCP to output the resulting plaintext content subsequently to the encryption processing means 150.

The encryption of the digital content by DTCP is executed by generating a key changing with time and by employing the so-generated key. The encrypted digital content, inclusive of the key used for encryption, is transmitted over the IEEE1394 serial bus. The receipt side decrypts the encrypted digital content, using the key contained therein.

More correctly, according to DTCP, an initial value of the key and a flag indicating the change timing of the key used in encrypting the digital content is included in the encrypted content. The receipt side modifies the initial value of the key contained in the encrypted content with a timing of a flag similarly contained in the encrypted content to generate a key used for encryption to decrypt the encrypted content. However, this may be thought to be equivalent to the encrypted content containing a key for decryption. Therefore, in the following, this understanding is used. It should be noted that an information version of the DTCP standard can be acquired by any person from DTLA (Digital Transmission Licensing Administrator).

Figure 2B:
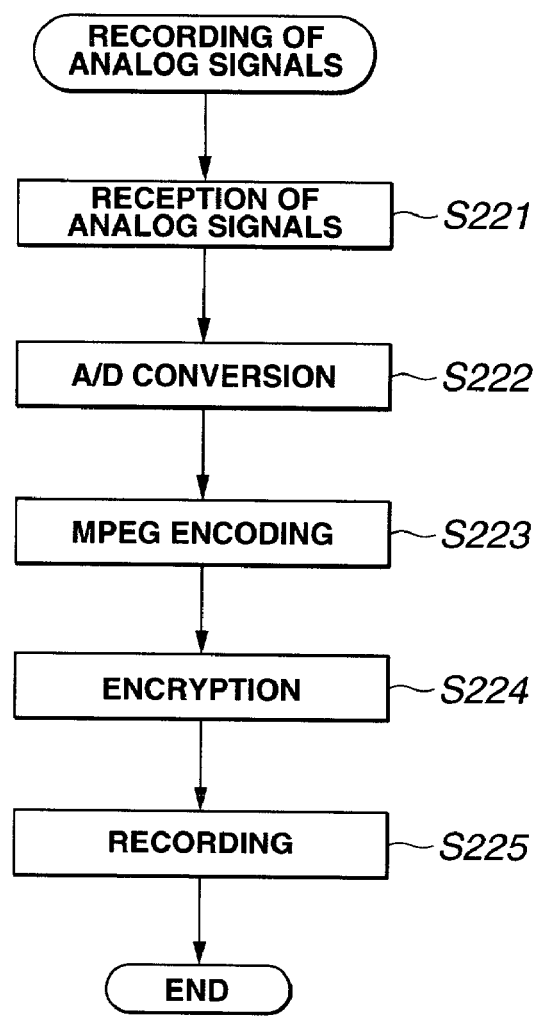

The processing of recording the content of analog signals from outside on the recording medium 195 is now explained with reference to the flowchart of FIG. 2B. When the content of the analog signals (analog content) are sent to the input/output I/F 140, the input/output I/F 140 at step S221 receives the analog content. The input/output I/F 140 then proceeds to S222 to A/D convert the analog content by the enclosed A/D-D/A converter 141 to form content of digital signals (digital content).

The digital content is sent to the MPEG codec 130. At step S223, the digital content is MPEG encoded, that is encoded by MPEG compression. The resulting encoded data is sent over the bus 110 to the encryption processing means 150.

Subsequently, at steps S224 and S225, the processing similar to that performed at steps S202 and S203 of FIG. 2A is performed. That is, the encryption processing by the encryption processing means 150 is executed and the resulting encrypted content is recorded on the recording medium 195. The recording processing is then terminated.

Figure 3A:
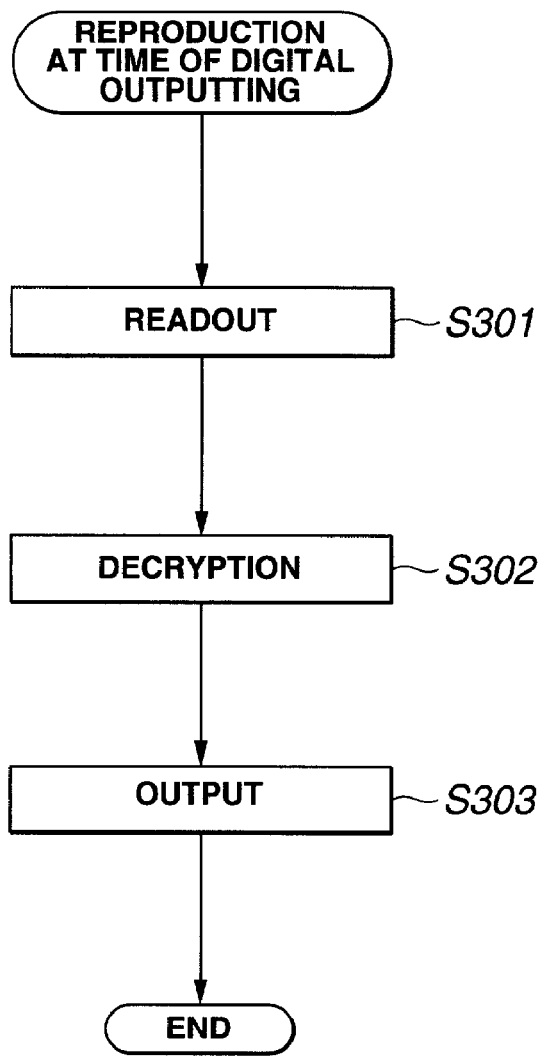
FIGS. 3A and 3B show data reproduction processing flow of the information recording and/or reproducing device of the present invention.

The processing of reproducing the content recorded on the recording medium 195 and outputting the reproduced content as digital or analog content is explained with reference to the flowcharts of FIGS. 3A and 3B. The processing of outputting the content as digital content to outside is executed as the reproduction processing conforming to the flowchart of FIG. 3A. That is, first, at step S301, the encrypted content, recorded on the recording medium 195, is read out by the recording medium interface 190, and output over the bus 110 to the encryption processing means 150.

The encryption processing means 150 at step S302 decrypts the encrypted content, supplied from the recording medium interface 190, and the resulting decrypted data is sent over the bus 110 to the input/output I/F 120. At step S303, the input/output I/F 120 outputs the digital content to outside to terminate the reproduction processing.

In outputting the digital content over the IEEE1394 serial bus, the input/output I/F 120 at step S303 undertakes authentication with a counterpart device, in accordance with the DTCP standard, as described above. The input/output I/F 120 then encrypts and transmits the digital content.

Figure 3B:
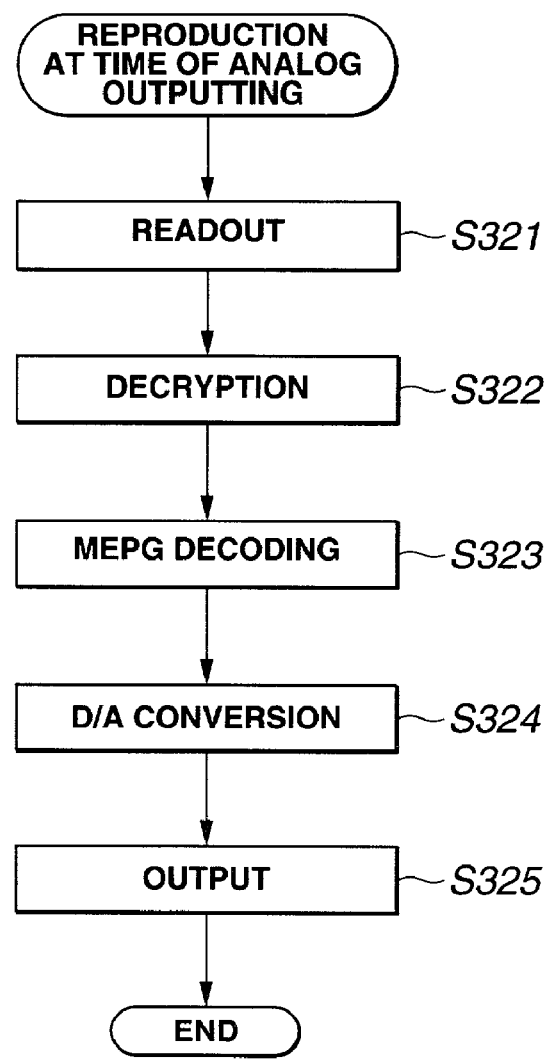

In reproducing the content recorded on the recording medium 195 and outputting the reproduced content as analog data to outside, the reproducing processing conforming to the flowchart of FIG. 3B is executed.

That is, at steps S321 and S322, the processing similar to that in steps S301 and S302 is carried out, whereby the decrypted digital content, obtained by the encryption processing means 150, is sent over the bus 110 to the MPEG codec 130.

The MPEG codec 130 at step S323 MPEG decodes, that is expands, the digital content, to output the expanded content to the input/output I/F 140. The input/output I/F 140 at step S324 D/A converts the digital content, MPEG decoded by the MPEG codec 130, by the enclosed A/D-D/A converter 141, to form analog content. The MPEG codec then proceeds to step S325 where the input/output I/F 140 outputs the analog content to outside to terminate the reproduction processing.

The configuration of distributing keys necessary for the recording and/or reproducing device of FIG. 1 to record or reproduce data on or from the recording medium, for example, a master key or a media key, to respective equipment, is now explained. The master key is a common key in the present system, owned in common by plural devices and recorded in the devices at the time of manufacture thereof. The master key is preferably common to all devices used in this key distribution system. The media key is a key proper to each recording medium and is recorded in the recording medium at the time of manufacture thereof. Ideally, the media key differs from one recording medium to another. However, from the constraint associated with the manufacturing process of the recording medium, the media key may more realistically be changed from one group made up of plural recording media to another. For example, the media key may be changed from one lot corresponding to a production lot of recording media as one group to another. The following description is centered about an instance of renewing these keys. However, the present invention may also be applied for distributing or recording these keys to or on a device not having a master key recorded or a recording medium not having a media key recorded.

Figure 4:
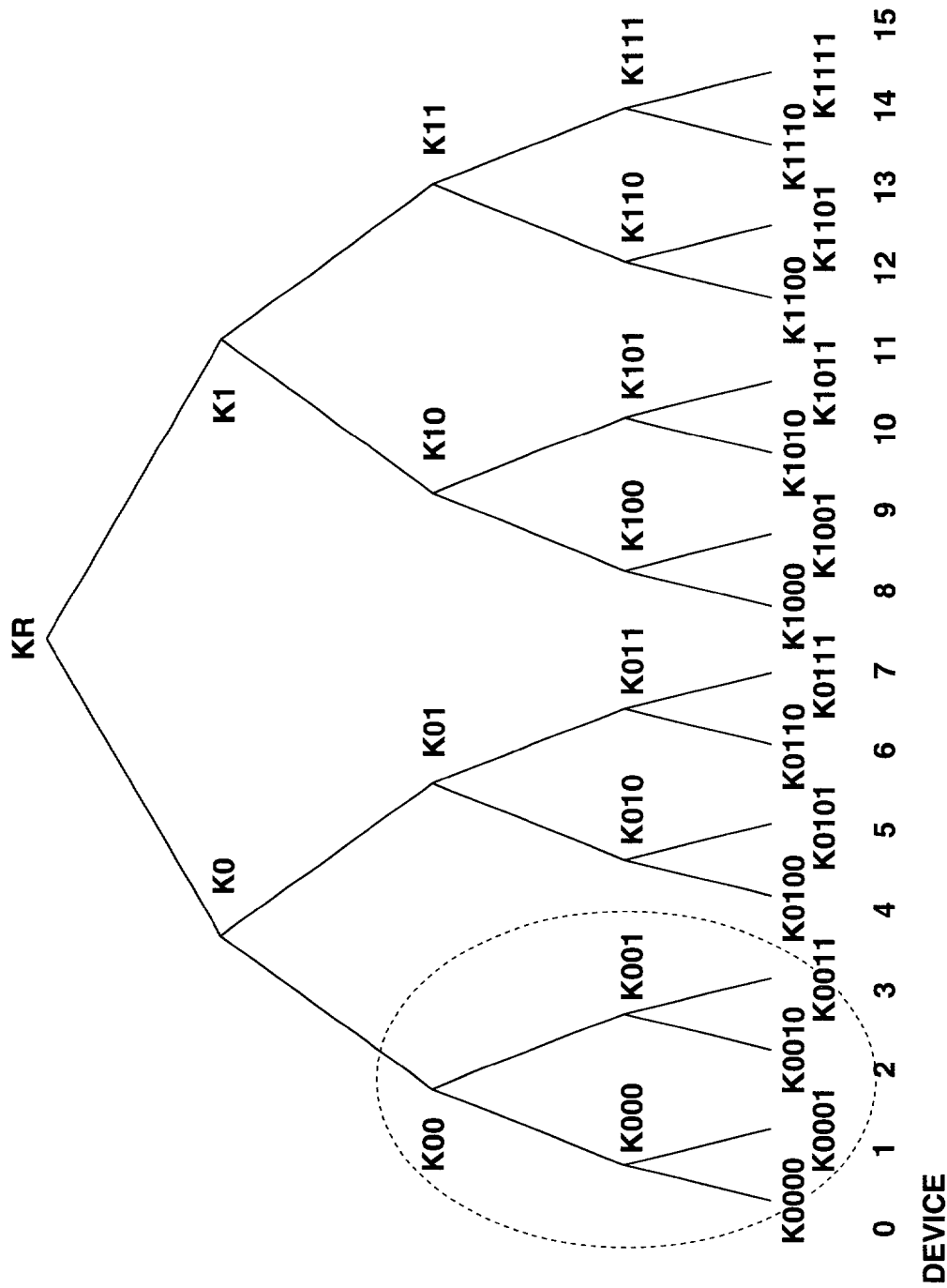
FIG. 4 shows a tree structure for illustrating the encryption processing for a key, such as a media key, for the information recording and/or reproducing device of the present invention.

FIG. 4 shows a key distribution configuration in a recording and/or reproducing device in a recording system employing the present system. The numbers 0 to 15 shown in the bottom row of FIG. 4 indicate respective recording and/or reproducing devices. That is, the respective leaves of the tree structure shown in FIG. 4 correspond to the respective recording and/or reproducing devices.

The respective devices 0 to 15 at the time of manufacture (shipment) include stored therein keys (node keys), assigned to nodes from own leaves to the root in a predetermined initial tree, and leaf keys of the respective keys. K0000 to K1111, shown at the bottom of FIG. 4, represent leaf keys assigned to the respective devices 0 to 15, with the keys from the top key to the keys entered in second nodes from the bottom KR to K111 being node keys.

In the tree structure, shown in FIG. 4, the device 0, for example, owns the leaf key K0000 and node keys K000, K00, K0 and KR. The device 5 owns K0101, K010, K01, K0 and KR, while the device 15 owns K1111, K111, K11, K1 and KR. Although only 16 devices of 0 to 15 are indicated in the tree of FIG. 4, with the tree configuration being of well-balanced left-right symmetrical structure in four rows, more devices may be entered in a tree, while the number of rows in the tree structure may differ from that shown therein.

The recording and/or reproducing devices, included in the tree structure of FIG. 4, are comprised of the recording and/or reproducing devices of variable types employing a variety of recording media, such as DVD, CD, MD or Memory Stick (trademark). Moreover, it may be presupposed that a variety of application services co-exist. The key distribution configuration shown in FIG. 4 is applied to this presupposed co-existing configuration of different applications.

In the system where these variable devices and applications co-exist, the portion surrounded by a dotted line in FIG. 4, that is devices 0 to 3, is set as a group employing one and the same recording medium. For the devices belonging to this group, defined by the dotted line, processing operations, such as encrypting common content to be forwarded from a provider, forwarding a master key used in common, or outputting payment data of content fee in a similarly encrypted form to a provider or to a settlement organization, may be executed at a time. The organization responsible for data transmission and reception to or from respective devices, such as the content providers or settlement organizations, execute the processing of forwarding data in a lumped form, with the portion surrounded by a dotted line in FIG. 4, that is the devices 0 to 3, as a group. A plural number of such groups exist in the tree structure of FIG. 4.

It should be noted that the node and leafkeys may be supervised in a centralized fashion by a sole key management center, or on the group basis by the providers or settlement organizations transmitting or receiving a variety of data to or from the respective groups. In case of, for example, key leakage, the node or leaf keys are renewed by the key management center, provider or by the settlement organizations.

As may be seen from FIG. 4, the four devices 0 to 3 of one group own common keys K00, K0 and KR as node keys. By exploiting this node key co-owning configuration, it becomes possible to furnish e.g., a common master key only to the devices 0 to 3. For example, if the co-owned node key K00 itself is set as a master key, a common master key can be set only for the devices 0 to 3 without executing new key forwarding operations. Moreover, if a value Enc (K00, Kmaster) obtained on encrypting a new master key Kmaster with the node key K00 is distributed over the network or as it is stored on a recording medium, only the devices 0 to 3 are able to decrypt the cipher Enc (K00, Kmaster) to obtain the master key Kmaster. Meanwhile, Enc (Ka, Kb) indicate data obtained on encrypting Kb with Ka.

If it is revealed at a certain time point t that the keys owned by the device 3, that is K0011, K001, K00, K0 and KR were analyzed by an aggressor (hacker) and disclosed, the device 3 subsequently needs to be separated from the system in order to protect data transmitted or received in the system (group of the devices 0 to 3). To this end, the node keys K001, K00, K0 and KR must be renewed to new keys K(t)001, K(t)00, K(t)0 and K(t)R, respectively, while these renewed keys must be transmitted to the devices 0, 1 and 2. Meanwhile, K(t)aaa denotes that it is a renewed key of a key Kaaa with a generation: t.

The processing of distributing a renewal key is explained. The renewal of a key is executed by storing a table formed by block data termed a key renewal block (KRB) shown for example in FIG. 5A in a network or in a recording medium and by sending the table to the devices 0 to 2.

The key renewal block (KRB), shown in FIG. 5A, is formed as block data of a data structure in which renewal is possible only for the devices in need of renewal of node keys. The block data shown in FIGS. 5A and 5B are formed with a view to distributing a renewal node key of the generation t to the devices 0, 1 and 2 of the tree structure shown in FIG. 4. As may be seen from FIG. 4, the devices 0 and 1 are in need of K(t)00, K(t)0 and K(t)R, as renewal node keys, whilst the device 2 is in need of K(t)001, K(t)00, K(t)0 and K(t)R, as renewal node keys.

As shown in the KRB of FIG. 5A, plural encrypted keys are contained in KRB. The encrypted key at the bottom row is Enc (K0010, K(t)001). This is a renewal node key K(t)001, encrypted by the leaf key K0010 owned by the device 2, so that the device 2 is able to decrypt the encrypted key by the device's own leaf key to obtain K(t)001. Moreover, using K(t)001, obtained on decryption, the encrypted keys Enc(K(t)001, K(t)00) in the second row from the bottom of FIG. 5A can be decrypted to give the renewed node key K(t)00. In a similar sequence of operations, the encrypted keys Enc(K(t)00, K(t)0) in the second row from top of FIG. 5A can be decrypted to give a renewed node key K(t)0, whilst the encrypted keys Enc(K(t)0, K(t)R) in the first row from top of FIG. 5A can be decrypted to give K(t)R. As for the devices 0 and 1, the node key K000 is not to be renewed. It is only K(t)00, K(t)0 and K(t)R that are needed as renewal node keys. As for the devices 0 and 1, the encrypted keys Enc(K000, K(t)00) in the third row from the top of FIG. 5A are decrypted to obtain K(t)00. Similarly, the encrypted keys Enc(K(t)00, K(t)0) in the second row from top of FIG. 5A are decoded to give a renewal node key K(t)0 and the encrypted keys Enc(K(t)0, K(t)R) in the first row from top of FIG. 5A are decrypted to give K(t)R. In this manner, the devices 0 to 2 are able to acquire the renewed keys K(t)R. Meanwhile, indices in FIG. 5A denote absolute addresses of the node and leafkeys used as decoding keys.

If renewal of the node keys K(t)0 and K(t)R in the topmost row of the tree structure shown in FIG. 4 is unneeded, whilst only the renewal of the node key K00 is needed, the key renewal block (KRB) of FIG. 5B may be used to distribute the renewal node key K(t)00 to the devices 0 to 2.

The KRB shown in FIG. 5B may be used in case a new master key to be co-owned by e.g., a specified group or a media key unique to a recording medium is to be distributed. As a specified instance, it is assumed that the devices 0 to 3 in the group shown by a dotted line in FIG. 4 are using a certain recording medium, and that a new common master key K(t)master is needed. At this time, data Enc(K(t), K(t)master), obtained on encrypting a new common renewed master key K(t)master using K(t)00, which is a renewed node key K00 common to the devices 0 to 3, is distributed along with the KRB shown in FIG. 5B. By this distribution, distribution as data not decrypted by an equipment of the other group, such as device 4, becomes possible. The same may be said of the media key.

That is, the devices 0 to 3 are able to decrypt the aforementioned cryptotext, using K(t)00 obtained on processing KRB to obtain the master key K(t)master or the media key K(t)media at a time point t.

To summarize, the processing at the respective devices may be explained as follows:

1. The respective devices check the index part of the KRB to be apprized of the structure of a tree sent with the KRB.
2. The devices decrypt the cryptotext using the uppermost one of node (live) keys not renewed by the KRB (in the present instance, K000 for the devices 0 and 1 and K0010 for the device 2) to acquire the renewed node key of the parent of the node in question.
3. The cryptotext is decrypted, using the renewed node key, to acquire the renewed node key of the parent node of the node in question.
4. The above sequence of operations is repeated to acquire the renewed node key of the uppermost node of KRB.

Meanwhile, the generation of the KRB represents the version of the KRB, such that, by using a larger value of the generation to represent the KRB of later origin, by way of an example, comparison may be made of the degree of newness of the KRBs. If the renewal of K(t)0 and K(t)R is not needed, K(t)00 can be co-owned by the devices 0, 1, 2 by employing the key renewal block (KRB) of FIG. 5B. That is, if, when the devices 1 to 3 form one group employing a given recording medium, the recording data is encrypted using the media key transmitted using K(t)00, the data so encrypted can be rendered not accessible from an equipment of some other group, such as device 4. Specifically, although the devices 0 to 2 co-own K(t)00, using e.g., FIG. 5B, the media key K(t)master at the time point t is encrypted and stored in this state in the recording medium which has held the KRB. The devices 0 to 2 decrypt the above cryptotext, using K(t)00 obtained on processing the KRB, to acquire the media key K(t)media at the time point t.

Figure 6:
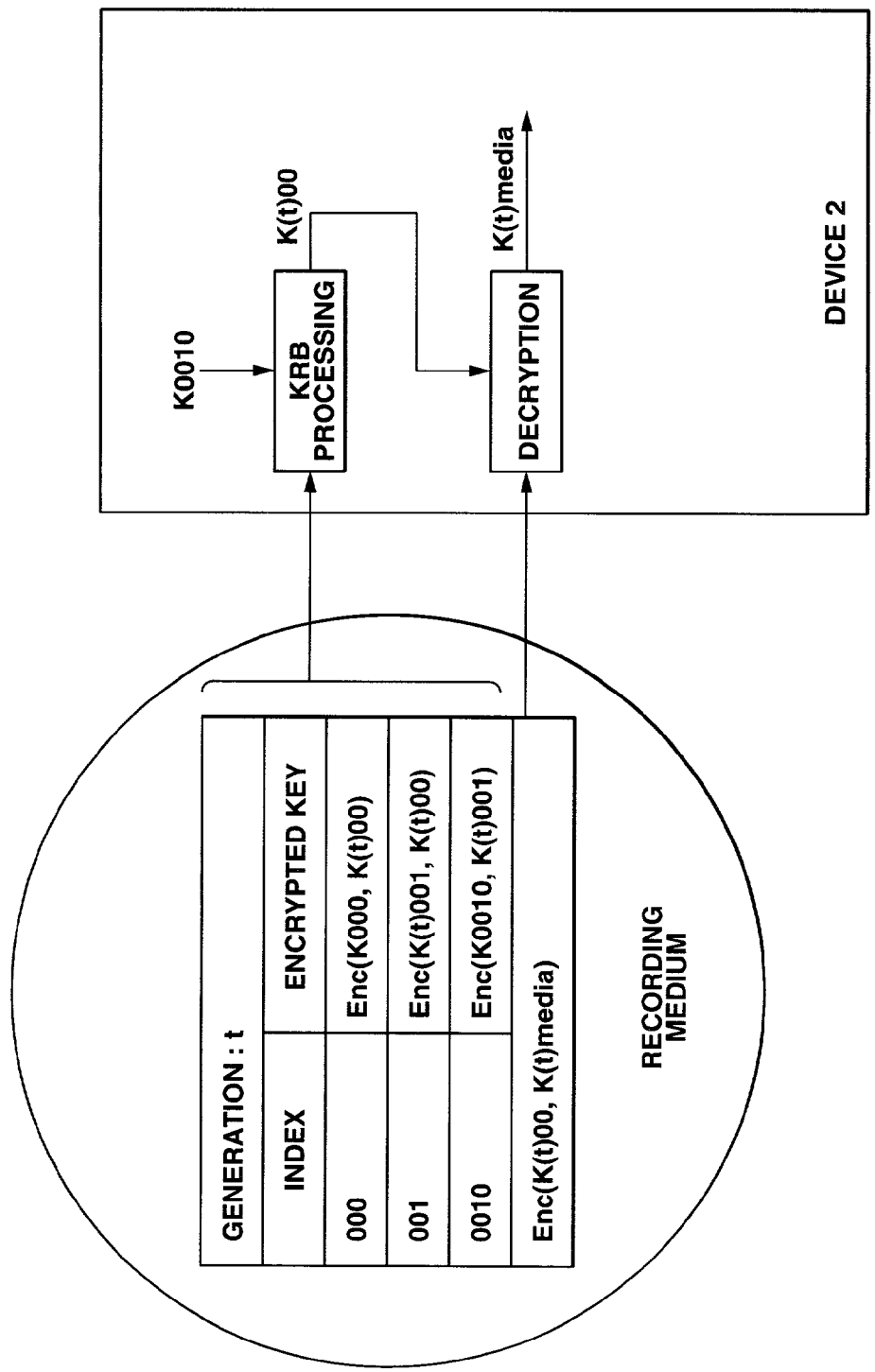
FIG. 6 shows an instance of distribution and an instance of decryption processing employing a key renewal block (KRB) for a media key in the information recording and/or reproducing device.

FIG. 6 shows, as a processing instance of obtaining the media key K(t)media at a time point t as proposed in a senior patent application of the present Assignee (JP Patent Application 2000-105328), the processing of the device 2 which has received, through the recording medium, data Enc(K(t)00, K(t)media) which has encrypted the new common media key K(t)media using K(t)00, and the KRB shown in FIG. 5B.

It is assumed that, as shown in FIG. 4, the four devices 0 to 3 encircled in a dotted line are included in a certain recording and/or reproducing system. FIG. 6 shows the processing in finding the media key needed for the recording and/or reproducing device (device 2) to encrypt or decrypt the content on the recording medium in case the device 3 is revoked and the media key assigned from one recording medium to another is used, with the aid of a key renewal block (KRB) and a device key memorized by the recording and/or reproducing device.

In a memory of the device 2, there are safely stored the leaf key K0010, assigned only to itself, and node keys K001, K00, K0 and KR of the respective nodes 001, 00, 0 and R from the leaf key up to the root of the tree. The device 2 has to decrypt the cryptotext with the index of 0010, in the KRB stored in the recording medium of FIG. 6, with an own leaf key K0010, to calculate the node key K(t)001 of the node 001, to decrypt the cryptotext with the index 001, using the so calculated node key, to calculate the node key K(t)$_{13}$ 00 of the node 00, and finally to decrypt the cryptotext with the index of 001, using the so calculated node key, to calculate the media key K(t)$_{13}$ media. The number of times of calculations is increased as the depth from the leaf to the node for encrypting the media key is increased. That is, voluminous calculations are needed in a large system where there exist a large number of recording and/or reproducing devices. The data encryption and decryption processing modes employing the so calculated and acquired media key are hereinafter explained.

Figure 7:
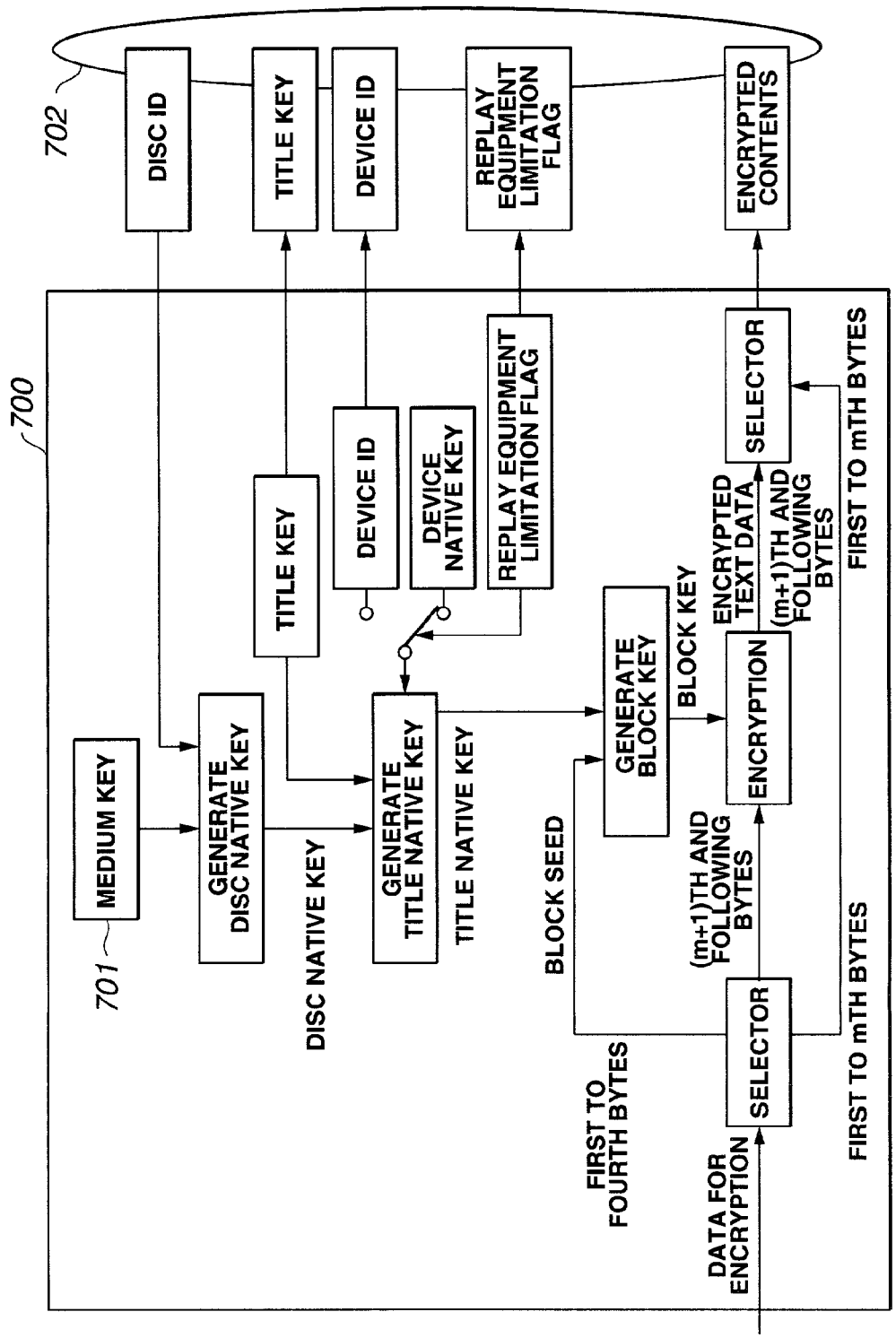
FIG. 7 is a block diagram for illustrating the encryption processing in data recording processing employing a media key in the recording and/or reproducing device according to the present invention.

Referring to the processing block diagram of FIG. 7, an instance of the data encryption processing executed by the encryption processing means 150 and the recording and/or reproducing processing for a recording medium is explained.

The recording and/or reproducing device 700 acquires the media key by the calculating processing based on the own KRB described above.

The recording and/or reproducing device 700 checks whether or not a disc ID as the identification information has already been recorded on e.g., a recording medium 702 as an optical disc. If the disc ID has already been recorded, the disc ID is read out. If otherwise, a disc ID 1701 is generated by e.g., a random number generation method selected at random or predetermined at the encryption processing means 150. The disc ID 1701 so generated is recorded on the disc. Since only one disc ID suffices for the disc, it may be stored e.g., in a lead-in area.

The recording and/or reproducing device 700 then generates a disc unique key, using the media key 701 and the disc ID. As a specified method for generating the disc unique key, a method of an instance 1 employing the results obtained on inputting the media key and the disc ID to a hash function employing a block cipher function, as shown in FIG. 8, or a method of an instance 2 employing, as a disc unique key, only a needed data length from a 160-bit output, obtained on inputting data generated on bit concatenation of the media key and the disc ID to the hash function SHA-1, as defined in FIPS (Federal Information Processing Standards Publications) 180-1.

Then, a title key, as a recording specific key, is generated in the encryption processing means 150 (see FIG. 1) at random or by a predetermined method, such as a random number generation, to record the so generated title key on the disc 702.

From a combination of the disc unique key, title key and the device ID or a combination of the disc unique key, title key and the device unique key, a title unique key is generated.

Figure 9:
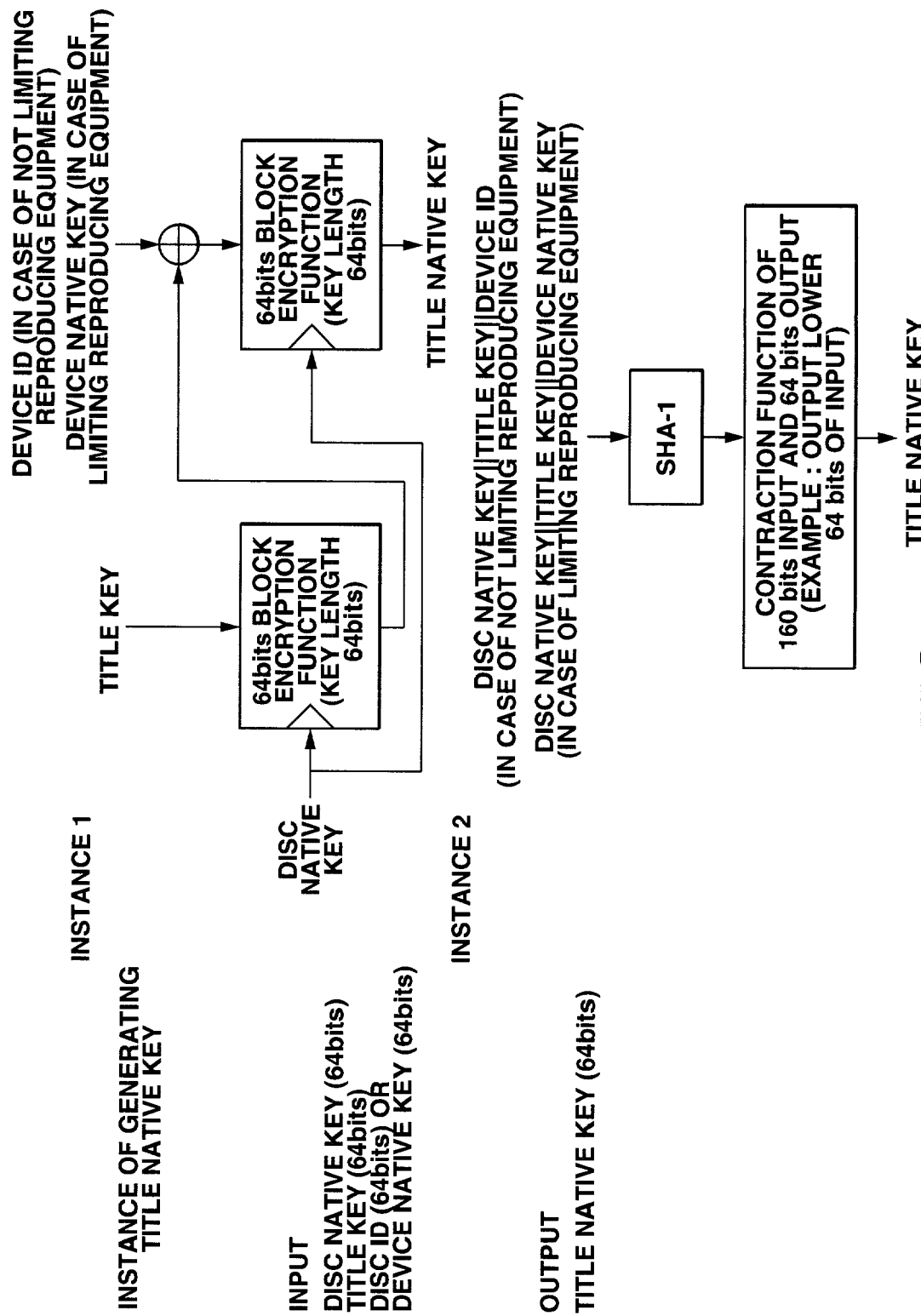
FIG. 9 shows an instance of generating and processing a key unique to a title, usable in the information recording and/or reproducing device according to the present invention.

For generating the title unique key, there may be used the method of the instance 1 employing the results obtained on inputting the title key and the disc unique key, the device ID (in case of not limiting the reproducing equipment) or the device unique key (in case of limiting the reproducing key) to the hash function employing the block cipher function, as shown in FIG. 9, or the method of the instance 2 employing, as the title unique key, only a needed data length from a 160-bit output obtained on inputting data generated on bit concatenation of the media key, disc ID and the device ID (in case of not limiting the reproducing equipment) or the device unique key (in case of limiting the reproducing key) to the hash function SHA-, 1 as defined in FIPS 180-1. Meanwhile, limitation of the reproducing equipment means rendering reproduction of content data stored in the recording medium possible only in a specified reproducing equipment.

In the foregoing explanation, the disc unique key is generated from the media key and the disc ID, and the title unique key is generated from the disc unique key, title key and the device ID or from the title key and the device unique key. Alternatively, the title unique key may directly be generated from the media key, disc ID, title key and the device ID or device unique key, without using the disc unique key. Still alternatively, a key equivalent to the title unique key may be generated from the media key, disc ID and the device ID or the device unique ID, without using the title key.

Referring to FIG. 7, the ensuing processing is explained. From a block seed, corresponding to separated leading number 1 to number 4 bytes of the block data, input as data for encryption, and from the previously generated title unique key, a block key, as a key for encrypting the block data, is generated.

FIG. 10 shows an instance of generating the block key. FIG. 10 shows two instances of generating a 64-bit block key from a 32 bit block seed and a 64 bit title unique key.

The instance 1, shown on an upper side, uses a 64-bit cipher function, with a key length being 64 bits, for each of an input and an output. The block seed and a 32-bit constant, concatenated together, are input and encrypted, using the title unique key as a key for this cipher function, to form a block key as the result of the encryption.

The instance 2 uses the hash function SHA-1 of FIPS 180-1. The title unique key and the block seed are concatenated together and input to the SHA-1 and a 160-bit output thereof, contracted to 64 bits, such as by employing only lower 64 bits thereof, is used as the block key.

In the foregoing, the instance of generating the disc unique key, title unique key and the block key has been explained. Alternatively, the block key may be generated using the media key, disc ID, title key, block seed and the device ID or the device unique key may be used from block to block to generate the block key, without generating the disc unique key or the title unique key.

When the block key is generated, block data are encrypted, using the so generated block key. As shown in the bottom part of FIG. 7, the leading number 1 to number m bytes, in being, for example, 8, of the block data, inclusive of the block seed, are separated (selector 1608), without being encrypted, while the number m+1 data up to the trailing data are encrypted. Meanwhile, the number 1 to number 4 bytes, as the block seed, are included in the non-encrypted m bytes. The block data as from the number m+1 byte, separated by the selector, are encrypted in accordance with the encryption algorithm preset on the encryption processing means 150. As the encryption algorithm, the DES (data encryption standard) provided for in, for example, FIPS 46-2, may be used.

By the above processing, the content is encrypted, on the block basis, by a block key generated based on the generation-managed media key or block seed, so as to be stored in the recording medium.

Figure 11:
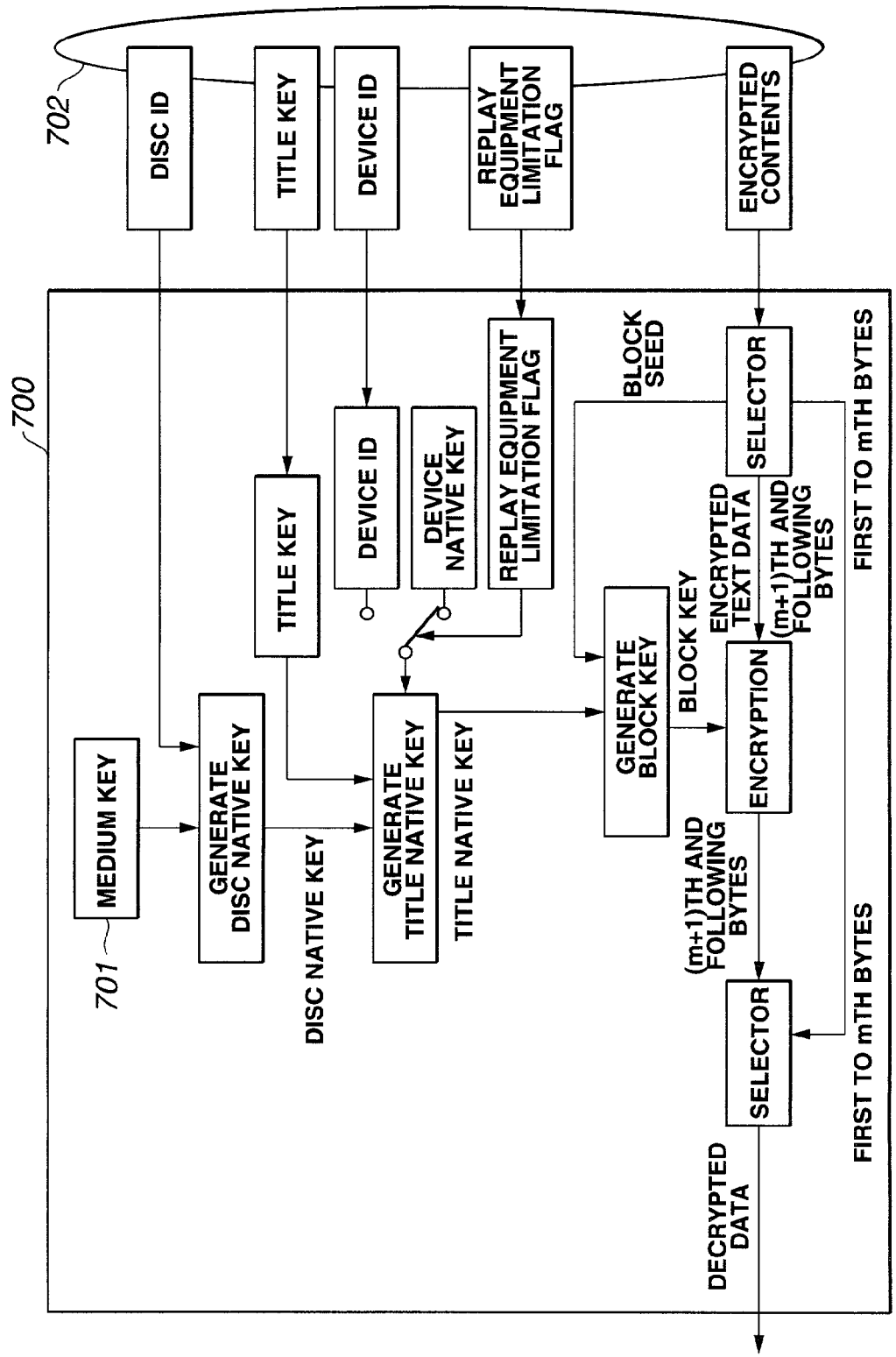
FIG. 11 is a block diagram for illustrating the decryption processing during data reproduction employing a media key in the information recording and/or reproducing device according to the present invention.

FIG. 11 shows a block diagram showing the processing of decrypting encrypted content data stored in the recording medium and of reproducing the so decrypted data.

In the reproducing processing, as in the encryption and recording processing explained with reference to FIGS. 7 to 10, a disc unique key is generated from the media key and the disc ID, a title unique key is generated from the disc unique key and the title key, and the block key is generated from the title key and the block seed as read out from the recording medium. The block-based encrypted data, read out from the recording medium 702, is decrypted, using the block key as the decrypting key.

In the encryption processing in recording content data on a recording medium and in the decryption processing in reproducing the content data from the recording medium, as described above, a media key is calculated based on the KRB. The key for encrypting or decrypting the content then is generated based on the so calculated media key or other identifiers.

In the above-described instance, the configuration of generating a key used for encrypting or decrypting the content data has been explained. Alternatively, the key used for encrypting and decrypting the content key may also be generated based not on the media key but on a master key common to the plural recording and/or reproducing devices or a device key unique to the recording and/or reproducing device, acquired from the KRB. The media key, master key or the device key per se, as acquired from the KRB, may also be applied as keys used for encrypting and decrypting the content data.

By employing the key renewal block (KRB) as described above, it is possible to furnish the renewed key only to the licenced authentic device, so that, by using the so furnished key, it is possible to encrypt the contents for the recording medium or to generate a key used for decrypting the contents read out from the recording medium. In the above configuration, such an instance has been explained in which only one key renewal block (KRB) is stored in one recording medium and used for acquiring the renewed key. An illustrative structure in which plural key renewal blocks (KRBs) are stored is explained. In this case, each of the encrypted contents data recorded on the recording medium is adapted to have the information based on which it is possible to identify from which KRBs on plural key renewal blocks KRBs the media key used for encrypting the contents data has been generated.

The KRB may be stored not only in the recording medium but also in a memory of the recording and/or reproducing device. The memory means for storage in the key renewal block (KRB) of the recording and/or reproducing device is of an overwritable configuration, such that, during accessing the recording medium, such as on loading the recording medium on the recording and/or reproducing device, the KRBs on the recording medium are retrieved, and the KRB of the latest version newer than that the device holds, if any, is substituted for the KRB the device holds.

Figure 12:
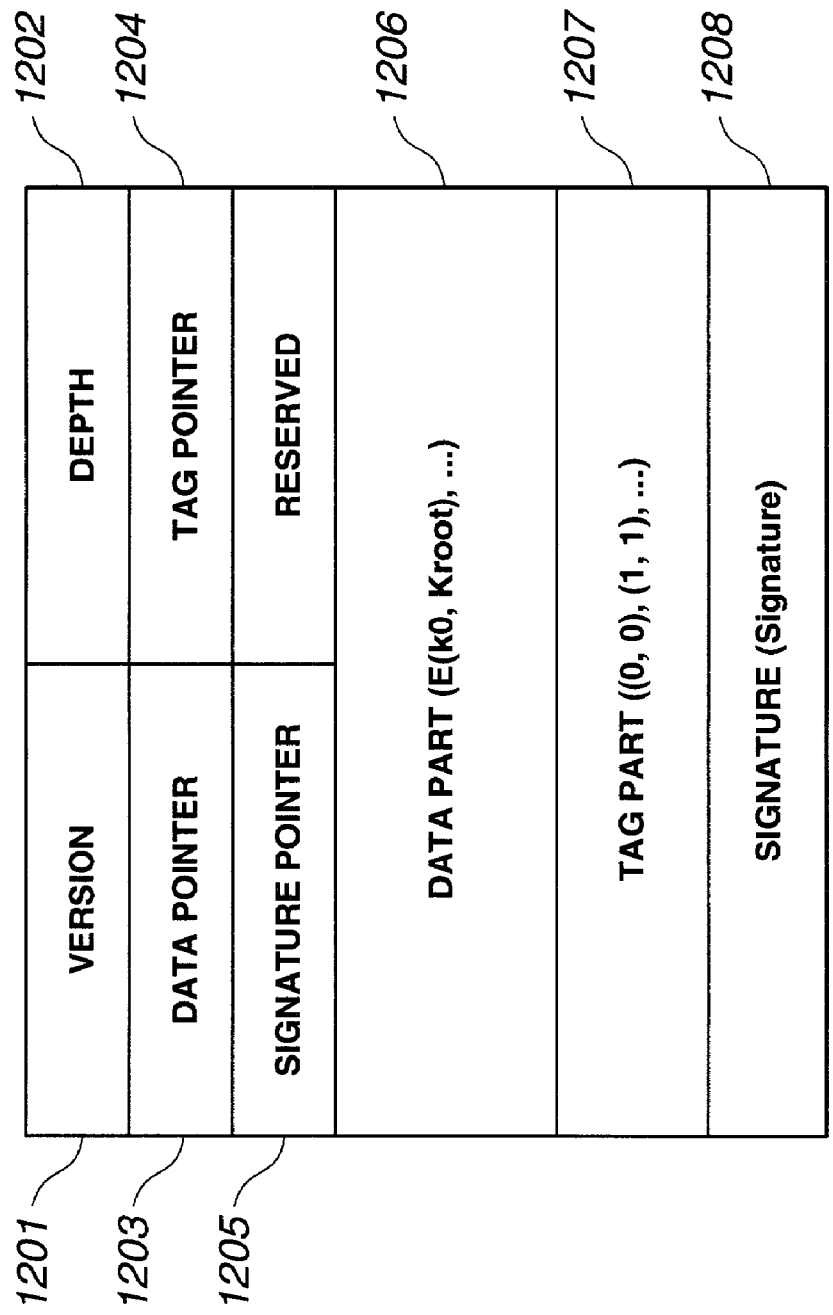
FIG. 12 shows an instance of a format of a key renewal block (KRB) used in the set of information recording and/or reproducing devices of the present invention.

FIG. 12 shows a typical format of a key renewal block (KRB). A version 1201 is an identifier indicating the version of the key renewal block (KRB). The depth denotes the number of layers of the hierarchical tree for a device which is the destination of distribution of the key renewal block (KRB). A data pointer 1203 points to the position of a data part in the key renewal block (KRB), whilst a tag pointer 1204 and a signature pointer 1205 point to the positions of a tag part 1207 and to a signature, respectively. The data part 1206 holds data which is an encrypted version of a node for renewal.

The tag part 1207 is a tag specifying the position relationship between the leaf key and the node key stored encrypted in the data part. The rule in imparting this tag is explained with reference to FIG. 13, which shows an instance of forwarding the key renewal block (KRB) explained with reference to FIG. 5A. The data is shown in a table on the right side of FIG. 13. The top node address included into the encrypting key at this time is a top node address. In this case, the top node address is KR because there is contained the renewed key K(t)R of the root key.

Figure 13:
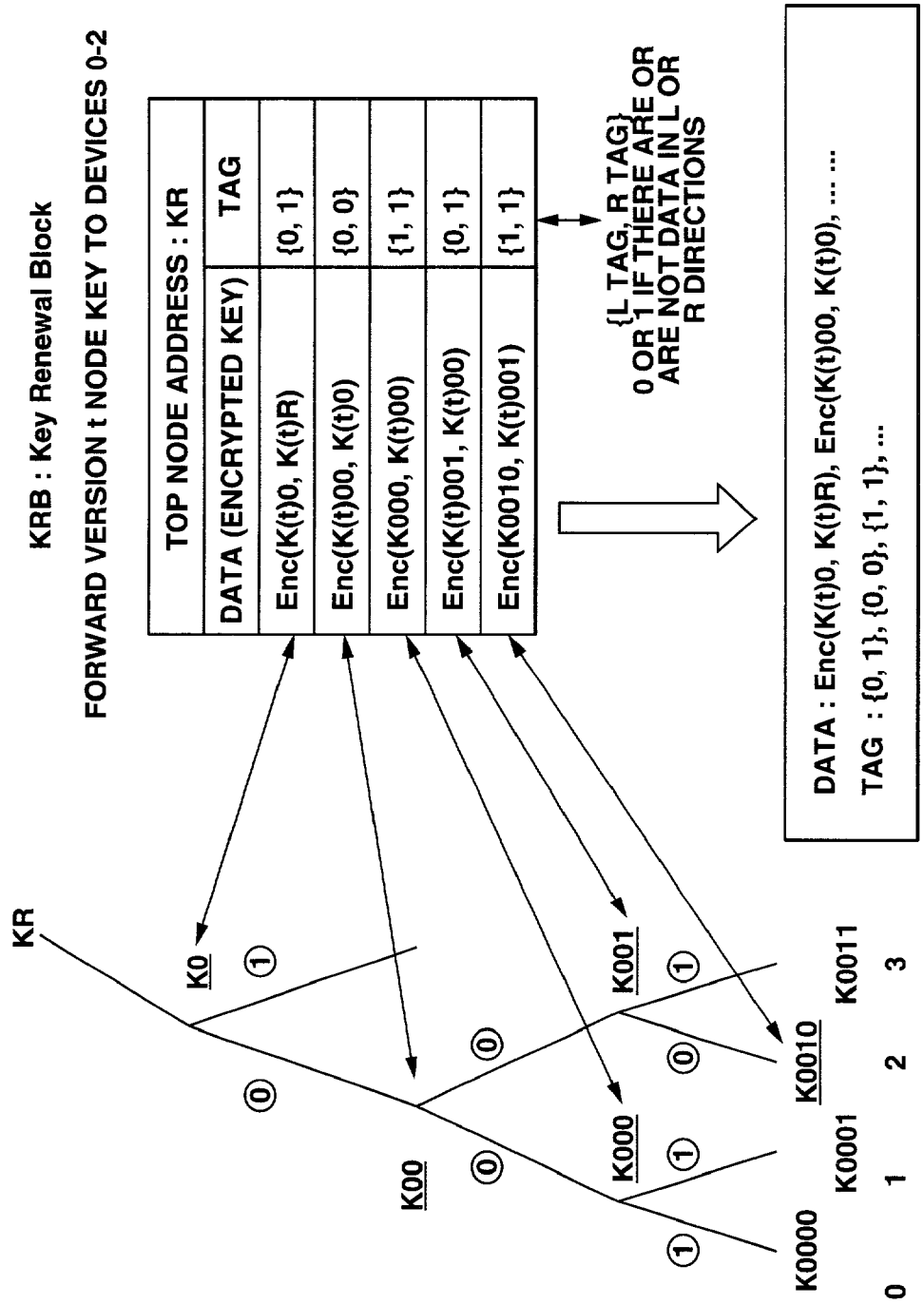
FIG. 13 illustrates the structure of a tag of a key renewal block (KRB) used in the set of information recording and/or reproducing devices of the present invention.

The Enc(K(t)0, K(t)R) at the uppermost row of the encrypting key is at a position indicated by arrow in a hierarchical tree shown on the left side of FIG. 13. The next data is ENC(K(t)00, K(t)0), lying at a lower left position with respect to the previous data. If there is or there is not any lower layer data for a given data, the tag for the given data is set to 0 or 1, respectively. The tag is represented as {left(L) tag, right(R) tag}. Since there is data on the left side of the uppermost row data Enc(K(t)0, K(t)R), the L tag is 0. However, since there is no data on the right side of the data Enc(K(t)0, K(t)R), the R tag is 1. In similar manner, the tags are set for all data so as to form a data column and a tag column shown on the lower side of FIG. 13.

Returning to FIG. 12, the KRB format is further explained. The signature is an electronic signature executed by e.g., a key management center, a contents provider or a settlement organization which has issued the key renewal block (KRB). The device which has received the KRB confirms, on signature verification, that the key renewal block (KRB) is one issued by an authentic key renewal block issuing concern.

A first embodiment of the renewal processing for the key renewal block (KRB) is explained. Referring to the block diagrams of FIGS. 14A and 14B and to the flowchart of FIG. 15, the configuration of storing plural key renewal blocks (KRBs) in the memory of the recording and/or reproducing device, and the processing of storing the latest KRB in the memory of the recording and/or reproducing device, that is the processing of renewing the key renewal block (KRB) stored in the recording and/or reproducing device, are hereinafter explained.

Figure 14A:
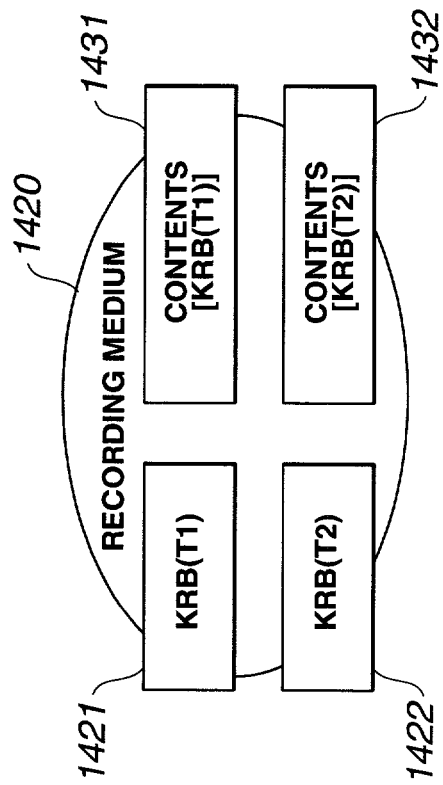
FIGS. 14A and 14B illustrate renewal processing of the key renewal block (KRB) in the recording and/or reproducing device and the recording media holding a plural number of the key renewal blocks (KRBs) in the the recording and/or reproducing devices of the present invention.

FIG. 14A, shown on an upper side in FIG. 14, shows the state prior to the loading of the recording medium on the recording and/or reproducing equipment. Specifically, FIG. 14A shows the state in which a sole key renewal block (KRB) 1411 is stored in a recording and/or reproducing device 1410, and in which two key renewal blocks (KRBs) 1421, 1422 are stored in a recording medium 1420.

The KRB stored in the recording and/or reproducing device 1410 is a key renewal block (KRB) 1411 of a version T1, whilst the KRBs stored in a recording medium 1420 are a key renewal block (KRB) 1421 of a version T1, and a key renewal block (KRB) 1422 of a version T2, which is newer than the version T1.

In the recording medium 1420, there are stored contents 1431, encrypted using a media key generated from the key renewal block (KRB) of the version T1, and contents 1432 encrypted using a media key generated from the key renewal block (KRB) of the version T2.

Figure 15:
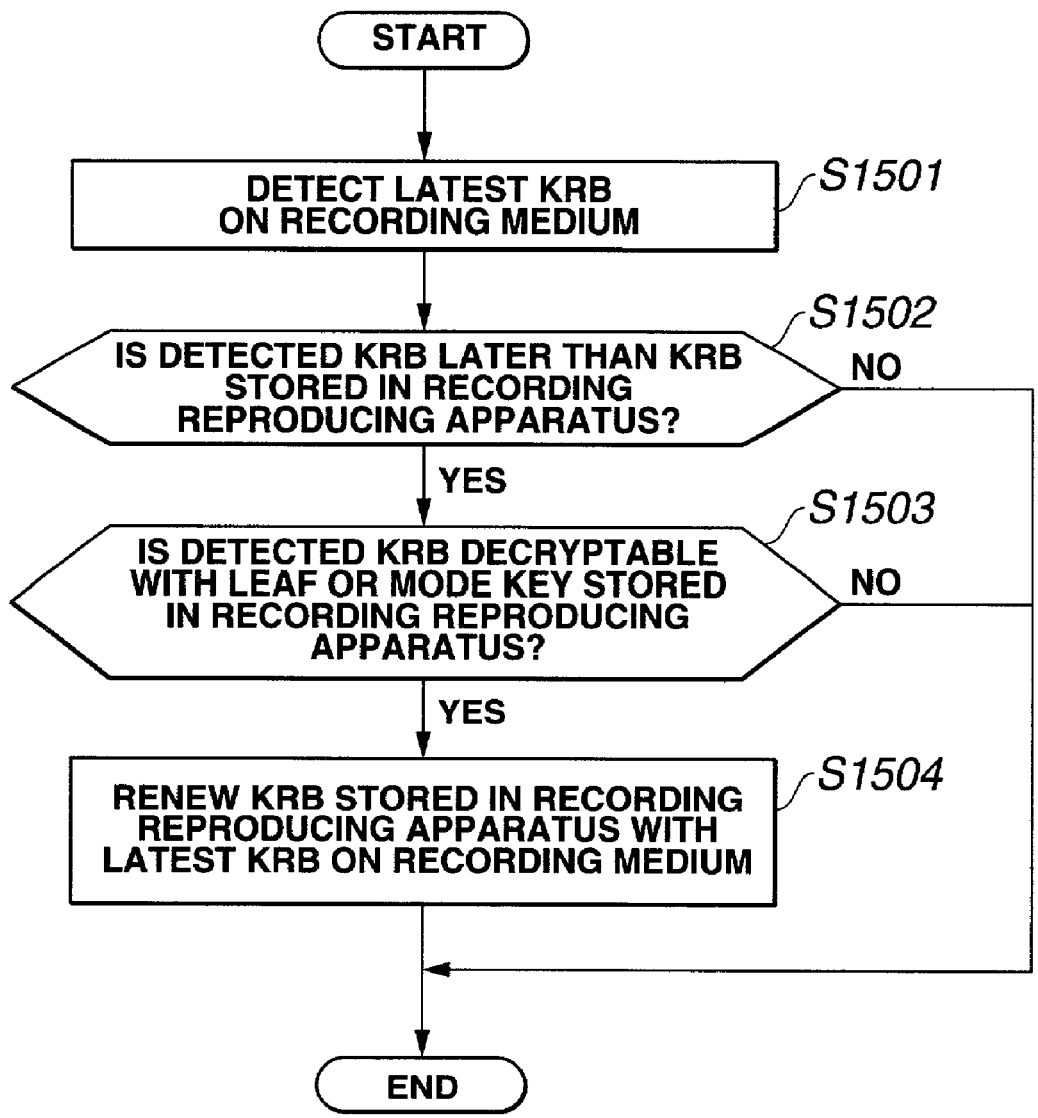
FIG. 15 is a flow diagram for illustrating the renewal processing of the recording and/or reproducing device of the present invention.

When the recording medium 1420 is loaded on the recording and/or reproducing device 1410, the device performs renewal processing for the key renewal blocks (KRBs) it holds, in accordance with the flowchart of FIG. 15.

At step S1501 of FIG. 15, the recording and/or reproducing device 1410 reads out the versions as the generations of all key renewal blocks (KRBs) stored in the recording medium 1420 to find the latest version. In the instance of FIG. 14A, the key renewal block (KRB) 1422 of the version T2 is of the latest version.

At step S1502, the recording and/or reproducing device 1410 compares the degree of newness of the key renewal block (KRB) stored in the memory in the recording and/or reproducing device (such as memory 180 of FIG. 1) to the latest KRB on the recording medium 1420 as detected at step S1501, that is a key renewal block (KRB) 1422 of the version T2.

In this comparison, if the KRB detected from the recording medium is newer, the program moves to step S1503. If otherwise, the program skips the steps S1503 and S1504 to terminate the processing.

In the instance of FIG. 14A, it is the key renewal block (KRB) 1411 of version T1 that is stored in the recording and/or reproducing device 1410 and the key renewal block (KRB) 1422 of the version T2 is newer than the first-stated block. Thus, the program moves to step S1503.

At step S1503, it is verified whether or not the newest KRB, scheduled to be renewed, can be decrypted with the leaf key or the node key owned by the recording and/or reproducing device 1410. That is, the key renewal blocks (KRBs) are sequentially decrypted, by the own leaf key or the node key, as explained with reference to FIGS. 4 to 6, to verify whether or not the node key of the new version of the updated generation information t, for example, K(t)00, or the root key K(t)R, is obtainable. This verification processing is performed by verifying whether or not an encrypting key decryptable on direct application of the own leaf or node key the recording and/or reproducing device holds is stored in an index part of the key renewal block (KRB) shown for example in FIG. 5.

If it is verified at step S1503 that the latest KRB scheduled to be decrypted can be decrypted using the leaf key or the node key held by the recording and/or reproducing device 1410, the program moves to step S1504. If otherwise, the program skips the step S1504 to terminate the processing.

Figure 14B:
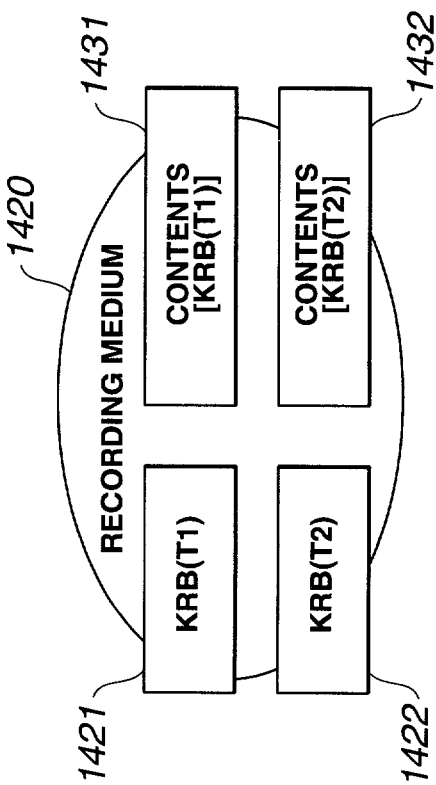

At step S1504, the key renewal block (KRB) 1411 of the version T1, stored in the memory of the recording and/or reproducing device 1410, is renewed, using the latest KRB stored in the recording medium 1420 as detected at step S1501. As a result, the KRB stored in the recording and/or reproducing device 1410 is updated to a key renewal block (KRB) 1412 of version T2, as shown in FIG. 14B.

The processing of recording contents data on the recording medium by the recording and/or reproducing device shown in FIG. 1 is now explained with reference to the flowcharts of FIGS. 16A, 16B and 17.

A recording and/or reproducing device 1610 of FIG. 16A, shown on an upper part in FIG. 16, holds a key renewal block (KRB) 1611 of version T2, and undertakes to encrypt the contents to record the encrypted contents in a recording medium 1620.

In the recording medium 1620, there are recorded a key renewal block (KRB) 1621 of version T1, and contents 1631, encrypted based on the media key generated from this key renewal block (KRB) 1621.

Figure 17:
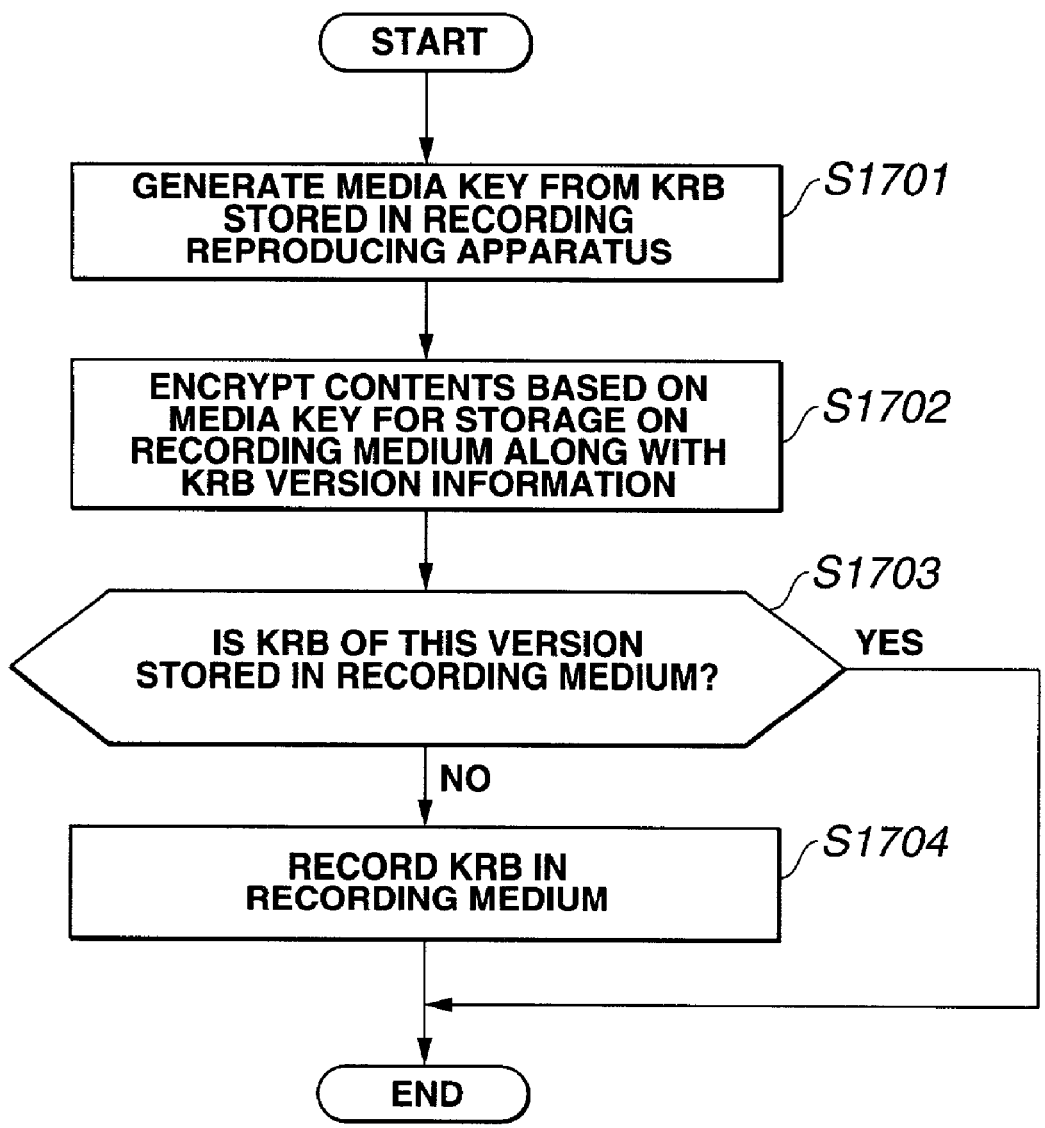
FIG. 17 is a flow diagram for illustrating the processing of encryption by the key acquired using the key renewal block (KRB) and the processing of storing the content in the recording and/or reproducing device of the present invention.

FIG. 17 shows the processing flow in recording the contents data on the recording medium. The respective steps of the flow of FIG. 17 are now explained.

At step S1701, the recording and/or reproducing device 1610 generates a media key from the key renewal block (KRB) 1611 of the version T2 held by the recording and/or reproducing device 1610 itself.

The recording and/or reproducing device 1610 is performing the processing of renewing the key renewal block (KRB) of FIG. 15, when the recording medium 1620 is loaded thereon, as explained previously, such that the latest one of the key renewal blocks (KRBs) in the device and on the recording medium, here the key renewal block (KRB) of version T2, is stored in the device memory.

At step S1702, the contents data are encrypted, based on this media key. This encryption processing is executed in accordance with, for example, the method explained with reference to FIG. 7. The contents data are subsequently recorded on the recording medium 1620. It should be noted that, in storing the encrypted contents on the recording medium 1620, the version as the generation information of the key renewal block (KRB) which has acquired the media key used in encrypting the contents, here the version T2 of the key renewal block (KRB) 1611, is recorded on the recording medium 1620 in association with the encrypted contents. The version as the generation information of the key renewal block (KRB), similarly to the auxiliary information of contents, such as title key, is recorded in the data management file, constituted as a management file correlated with the contents data, and stored in this form on the recording medium 1620.

The recording and/or reproducing device 1610 then at step S1703 inspects whether or not the key renewal block (KRB) of the same version as that used in generating the media key has been stored in the recording medium 1620. If the block is stored in the recording medium 1672, the step S1704 is skipped to terminate the processing and, if otherwise, the program moves to step S1704.

At step S1704, the recording and/or reproducing device 1610 records the key renewal block (KRB) of the same version as that used in generating the media key, here the key renewal block (KRB) of the version T2, on the recording medium 1620, to finish the recording processing of the contents data. By the above processing, the encrypted contents data, obtained on encryption with the media key acquired from the latest available KRB and the latest key renewal block (KRB) required for obtaining the media key required in turn for performing the contents encrypting processing, can be recorded on the recording medium 1620, as shown in FIG. 16B.

Figure 18:
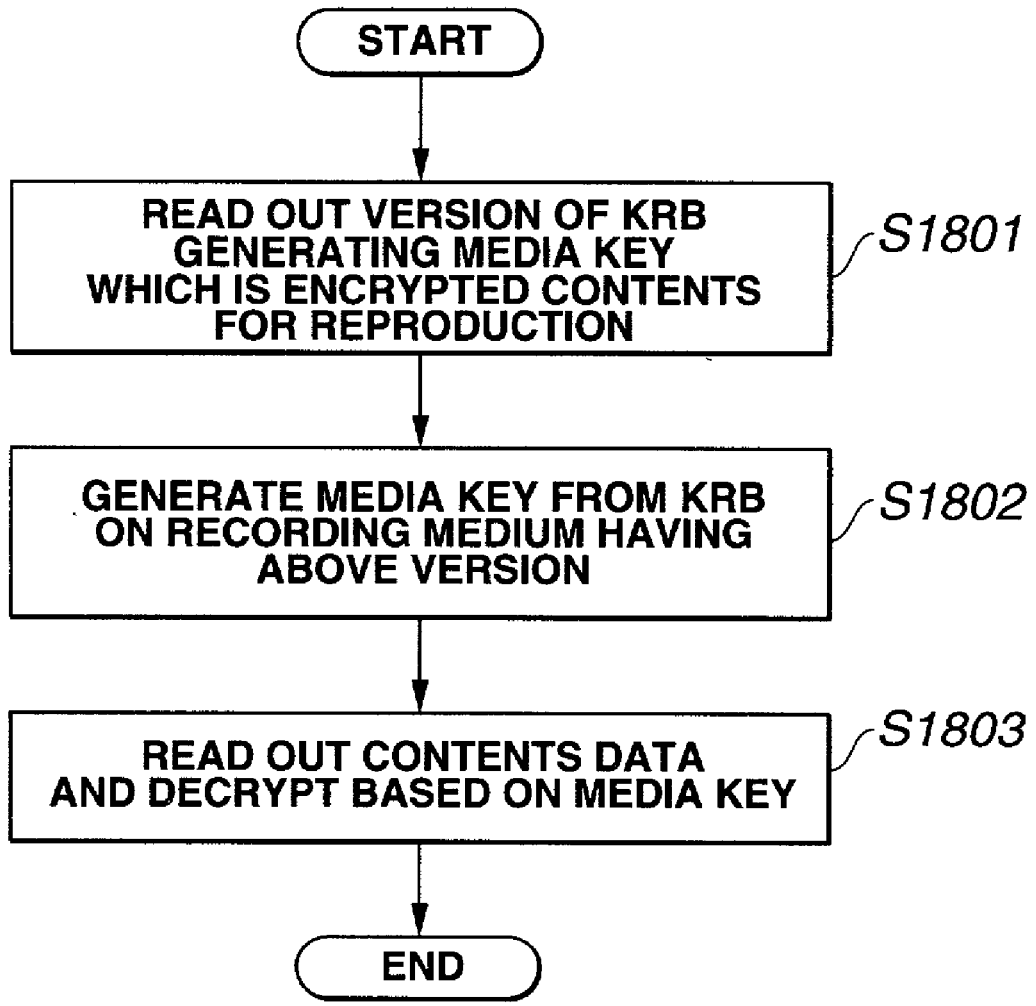
FIG. 18 is a flow diagram for illustrating the processing of encryption by a key acquired using the key renewal block (KRB) and the processing of reproducing the content in the information recording and/or reproducing device fthe present invention.

The processing of the recording and/or reproducing device of reading out from the recording medium the contents data encrypted, using the key obtained based on the latest available key renewal block (KRB), and recorded in this state, is now explained using a flowchart of FIG. 18.

At step S1801, the recording and/or reproducing device reads out the version as the generation information of the key renewal block (KRB) designed for generating a media key which has encrypted the contents data to be reproduced. The version as the generation information of the key renewal block (KRB) corresponding to the respective contents data on the recording medium is written in, for example, the aforementioned data management file.

At step S1802, the recording and/or reproducing device detects, from one or more key renewal blocks (KRBs) stored in the recording medium, such a one having the same version as that of the generation information read out at step S1801, and decrypts the key renewal block (KRB) to generate a media key.

The recording and/or reproducing device then at step S1803 reads out the contents data from the recording medium to decrypt the read-out contents data based on the media key generated at step S1802 to use the so decrypted data. The contents data stored in the recording medium can be reproduced by the above processing.

Thus, the set of information recording and/or reproducing devices of the present invention is configured so that the latest key renewal block (KRB) is taken out from the recording medium holding plural key renewal blocks (KRBs), having plural different generations or versions, and is stored in the memory of the recording and/or reproducing device, and so that, in the processing of storing the contents on a recording medium, the latest usable key renewal block (KRB) is detected from the plural KRBs stored in the memory of the recording and/or reproducing device or on the recording medium, and a media key, for example, is acquired from the latest key renewal block (KRB) for storage in the recording medium. The key renewal block (KRB) which has acquired the media key used in encrypting the contents is newly stored in the recording medium.

So, the KRBs of plural versions can be stored in the recording medium, the contents encrypted with the media key acquired from the different KRBs can be stored in the recording medium. In newly recording the contents on a recording medium, the contents are encrypted, using the media key calculated based on the latest KRB held by the recording and/or reproducing device and by the recording medium at such time point. Thus, if the KRB of the old version used in contents encryption at the time of manufacture of the recording medium has already been stored in the recording medium, a KRB of a new version is issued by the key renewal processing executed by the key management center, provider or the settlement organization, as the illicit equipment is revoked, as already explained with reference to FIGS. 4 and 5, whereby the encrypted contents subsequently stored on the recording medium are encrypted based on the media key acquired from the KRB of the new version that can be acquired solely by the authorized equipment, thus enabling the elimination of decryption and reproduction by the revoked equipment.

The foregoing description of the preferred embodiment has been made in connection with an instance of e mnploying the media key as a key for encryption. However, the key for encryption, renewed by the KRB, can also be e.g., a master key common to plural recording and/or reproducing devices or a device key unique to each information recording and/or reproducing device. Moreover, the key renewal by KRB may be applied to key renewal for a master key or device keys, in the same way as key renewal for media keys.

In the above-described embodiment, the renewal processing of the key renewal block (KRB) is performed at a time point of loading the recording medium 1620 on the recording and/or reproducing device 1610. Alternatively, the processing for renewing the key renewal block (KRB) may also be performed at a time point of the recording and/or reproducing processing.

A second embodiment of the renewal processing for the key renewal block (KRB) in the recording and/or reproducing device is now explained. The processing of renewing the key renewal block (KRB) in the recording and/or reproducing device and on the recording medium is explained in FIG. 19ff.

Figure 19A:
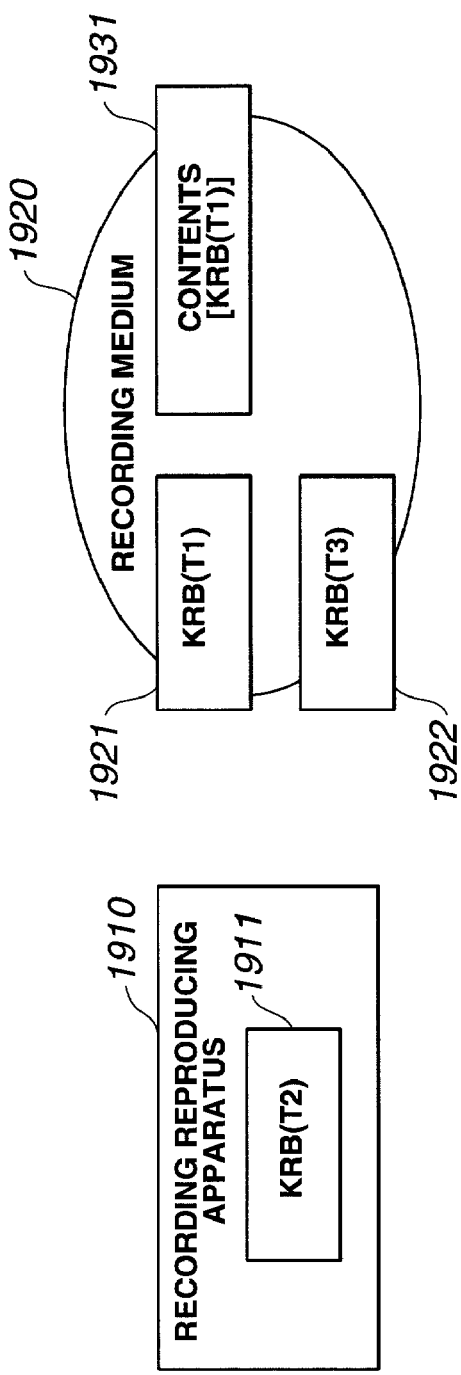
FIGS. 19A and 19B illustrate the renewal of the key renewal block (KRB) stored in the recording and/or reproducing device according to the present invention.
Figure 19B:
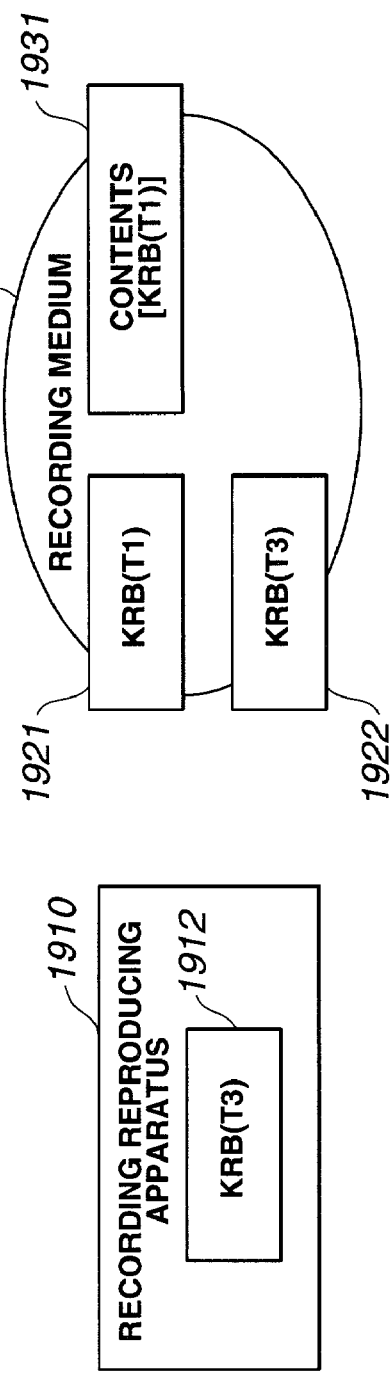

FIGS. 19A and 19B show the processing of renewing the key renewal block (KRB) in the recording and/or reproducing device. FIG. 19A shows the state prior to loading of the recording medium on the recording and/or reproducing device. Specifically, FIG. 19A shows the state in which a sole key renewal block (KRB) 1911 is stored in a recording and/or reproducing device 1910 and in which two key renewal blocks (KRBs) 1921, 1922 are stored in the recording medium 1920.

The KRB stored in the recording and/or reproducing device 1910 is a key renewal block (KRB) 1911 of version T2, whereas the KRBs stored in the recording medium 1920 is a key renewal block (KRB) 1922 of version T3. It should be noted that, of the versions T3, T2 and T1, T3 is the latest version, with the version T1 being the oldest.

In the recording medium 1920, the contents 1931, encrypted using the media key generated from the key renewal block (KRB), is stored.

When the recording medium 1920 is loaded on the recording and/or reproducing device 1910 and accessed by the recording and/or reproducing device 1910, the recording and/or reproducing device 1910 retrieves the KRB of the latest version of the KRBs on the recording medium 1920. The latest version is T3, which version T3 is newer than the key renewal block (KRB) 1911 of the version T2 stored in the recording and/or reproducing device 1910. So, the KRB stored in the recording and/or reproducing device is renewed, using the key renewal block (KRB) 1922 of the version T3. As a result, the key renewal block (KRB) 1911 of the version T2 stored in the recording and/or reproducing device 1910 is replaced by a key renewal block (KRB) 1912 of the new version T3.

Figure 20A:
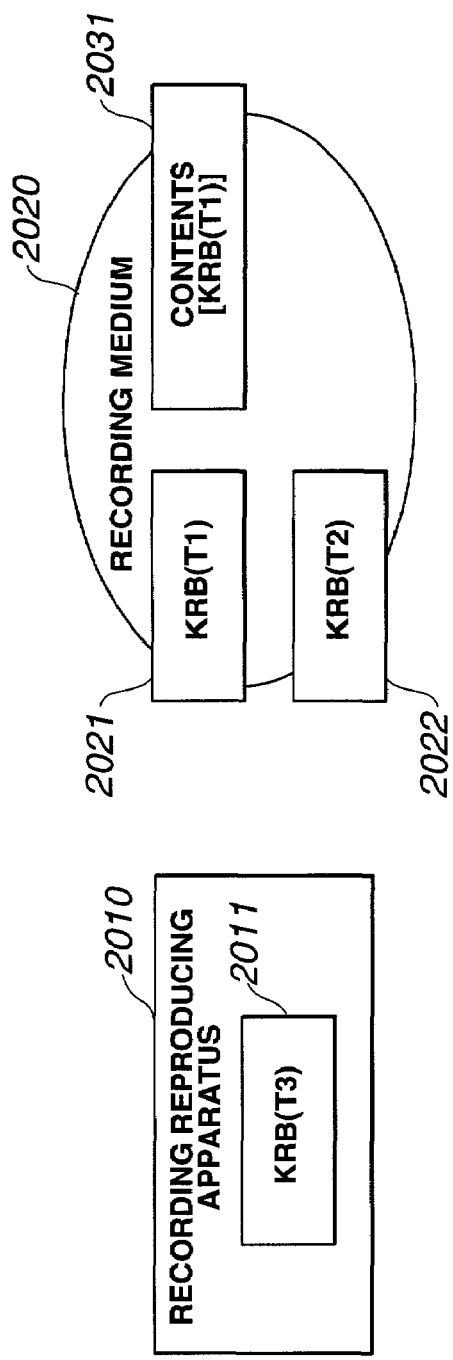
FIGS. 20A and 20B illustrate renewal processing of the key renewal block (KRB) stored in the recording medium in the recording and/or reproducing device according to the present invention.
Figure 20B:
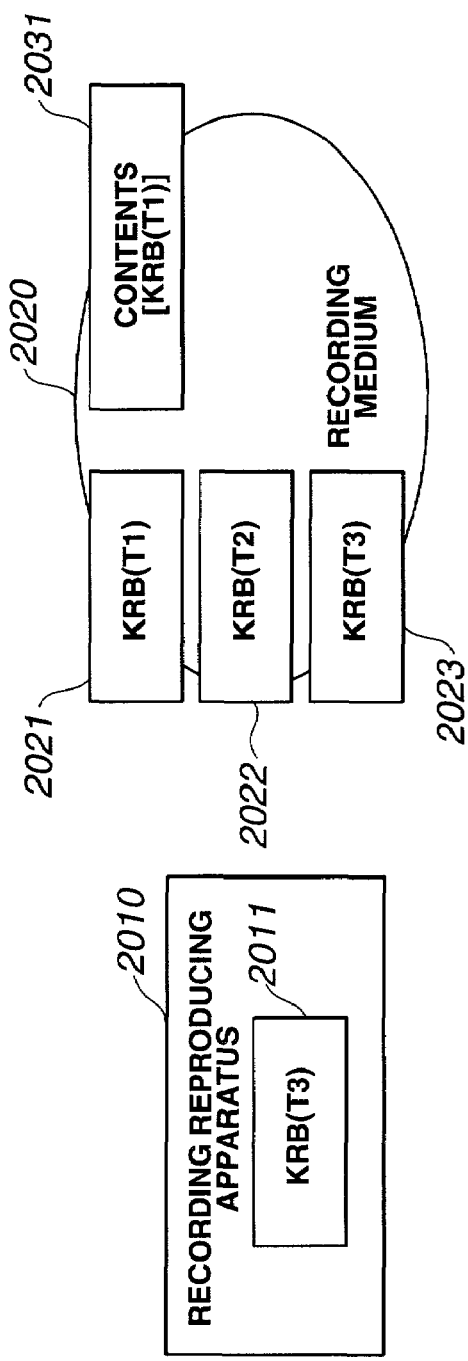

If the KRB stored in the recording and/or reproducing device is newer than any of the KRBs stored in the recording medium, the new KRB is stored in the recording medium at the time of accessing the recording medium. FIGS. 20A and 20B show the concept of recording the new KRB by the recording and/or reproducing device on the recording medium.

FIG. 20A shows the state prior to loading of the recording medium on the recording and/or reproducing device. Specifically, FIG. 20A shows the state in which a sole key renewal block (KRB) 2011 is stored in a recording and/or reproducing device 2010 and in which two key renewal blocks (KRBs) 2021,2022 are stored in the recording medium 2020.

The KRB stored in the recording and/or reproducing device 2010 is a key renewal block (KRB) 2011 of version T3, whereas the KRBs stored in the recording medium 2020 are a key renewal block (KRB) 2021 of version T1 and a key renewal block (KRB) 2022 of version T2. It should be noted that, of the versions T3, T2 and T1, T3 is the latest version, with the version T1 being the oldest.

In the recording medium 2020, the contents 2031, encrypted using the media key generated from the key renewal block (KRB) of version T1, are stored.

When the recording medium 2020 is loaded on the recording and/or reproducing device 2010 and accessed by the recording and/or reproducing device 2010, the recording and/or reproducing device 2010 retrieves the KRB of the latest version of the KRBs on the recording medium 2020. The latest version is T2, which version T2 is older than the key renewal block (KRB) 2011 of the version T3 stored in the recording and/or reproducing device 2010. So, the key renewal block KRB 2011 of the version T3 is recorded on the recording medium 2020. As a result, the key renewal block (KRB) 2023 of the new version T3 is added on the recording medium 2020.

Moreover, in the recording and/or reproducing device of the present invention, the KRB used in encrypting none of contents data and which is not the latest version on the recording medium is deleted. FIGS. 21A and 21B show the concept of deleting the unneeded KRB on the recording medium by the recording and/or reproducing device.

FIG. 21A shows the state prior to loading of the recording medium on the recording and/or reproducing device. Specifically, FIG. 21A shows the state in which a sole key renewal block (KRB) 2111 is stored in a recording and/or reproducing device 2111 and in which three key renewal blocks (KRBs) 2121, 2122 and 2123 are stored in the recording medium 2120.

The KRB loaded on the recording and/or reproducing device 2110 is a key renewal block (KRB) 2111 of any optional version, whilst the KRBs stored in the recording medium 2120 are a key renewal block (KRB) 2121 of version T1, a key renewal block (KRB) 2122 of version T2 and a key renewal block (KRB) 2123 of version T3. It should be noted that, of the versions T3, T2 and T1, T3 is the latest version, with the version T1 being the oldest.

In the recording medium 2120, there are stored contents 2131 encrypted using the media key generated from the key renewal block (KRB) of the version T1.

When the recording medium 2120 is loaded on the recording and/or reproducing device 2110, and the recording medium 2120 is accessed by the recording and/or reproducing device 2110, the recording and/or reproducing device retrieves a key renewal block (KRB) not used in encrypting contents data and which is not the latest one on the recording medium 2120. In the instances of FIGS. 21A, 21B, the key renewal block (KRB) 2122 of the version T2 is detected as being the KRB satisfying the condition. The recording and/or reproducing device 2110 deletes the detected key renewal block (KRB) not used in encrypting contents data and which is not the latest one on the recording medium 2120. As a result, the there are recorded on the recording medium 2120 the key renewal block (KRB) 2121 of the version T1 used for encrypting the contents and the key renewal block (KRB) 2123 of the latest version T3 as shown in FIG. 21B. As a result, the recording area of the recording medium can be used effectively.

The three sorts of the KRB renewal processing, as explained with reference to FIGS. 19, 20 and 21, may be executed e.g., at a time point of loading the recording medium on the recording and/or reproducing device. Specifically, when the loading of the recording medium on the respective device is detected, a CPU 170 reads out and executes the KRB renewal processing program stored in a ROM 160 or in a memory 170. This processing sequence is explained in accordance with the flowchart of FIG. 22.

Figure 22:
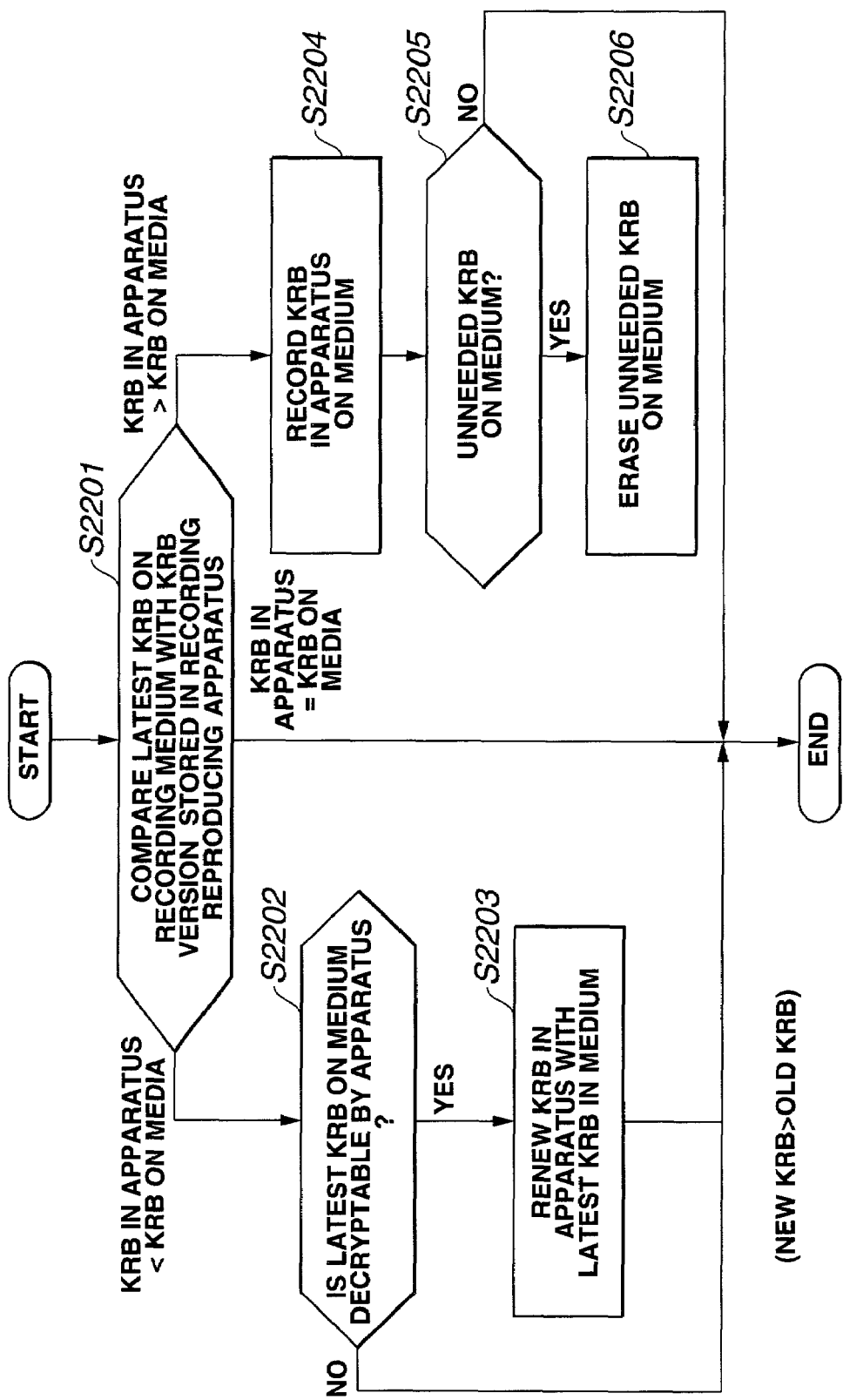
FIG. 22 is a flow diagram for illustrating the renewal and deletion processing for the key renewal block (KRB) in the recording and/or reproducing device according to the present invention.

At step S2201 of FIG. 22, the recording and/or reproducing device retrieves all KRBs on the recording medium and compares the latest one of these KRBs and the version (generation) of the KRB stored in recording means in the recording and/or reproducing device. If these versions are the same, processing is finished without doing anything.

If the latest KRB on the recording medium is newer than the KRB in the recording and/or reproducing device, the program moves to step S2202, where it is verified whether or not the latest KRB scheduled to be renewed can be decrypted using the leaf key or the node key held by the recording and/or reproducing device. That is, as explained with reference to FIGS. 4 to 6, the key renewal blocks (KRBs) are sequentially decrypted, using the leaf key or the node key held by the recording and/or reproducing device itself, to verify whether or not the node key of the new version, with the renewed generation information t, such as K(t)00 or the root key K(t)R, can be acquired. This processing of verification is carried out by checking whether or not an encrypting key that can be decrypted on direct application of the own leaf key or the node key is stored in any index in the key renewal block (KRB) shown for example in FIG. 5.

If it is verified at step S2202 that the latest KRB scheduled to be renewed using the leaf key or the node key owned by the recording and/or reproducing device is decryptable, the program moves to step S2203. If otherwise, the skip S2203 is skipped to finish the processing. At step S2203, the KRB in the recording and/or reproducing device is updated, using the latest KRB on the recording medium, as explained with reference to FIG. 19, to finish the processing.

On the other hand, if at step S2201 KRB in the recording and/or reproducing device is newer than the latest KRB on the recording medium, the program reverts to step S2204.

At step S2204, the KRB in the recording and/or reproducing device is recorded on the recording medium. The program then moves to step S2205. At this step S2205, it is verified whether or not there is any unneeded KRB on the recording medium. The unneeded KRB is such a KRB which is not used for encrypting any contents data stored on the recording medium, and which is not the latest KRB on the recording medium. If any such KRB exists, the program moves to step S2206 to erase the KRB from the recording medium to finish the processing.

If there is no unneeded KRB at step S2205, the step S2206 is skipped to finish the processing. Renewal of KRBs in the recording and/or reproducing device, recording of the new KRB on the recording medium and deletion of the unneeded KRB from the recording medium may be realized as discussed above.

Figure 23:
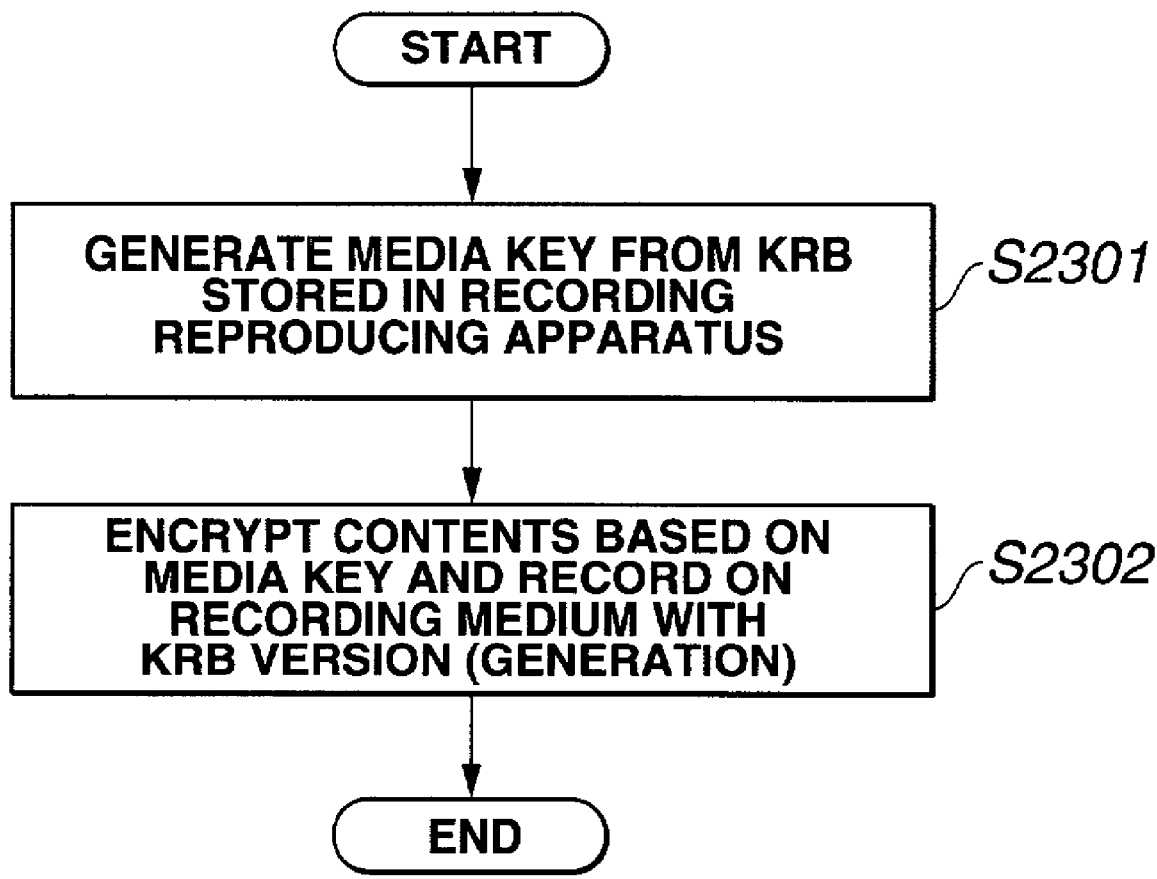
FIG. 23 is a flow diagram for illustrating the processing of encryption by a key acquired using the key renewal block (KRB) and the processing of storing the content in the recording and/or reproducing device according to the present invention.

The processing of recording contents data on the recording medium by the recording and/or reproducing device shown in FIG. 1 is explained with reference to the flowchart of FIG. 23.

At step S2301, the recording and/or reproducing device generates a media key from the KRB held by the device itself. At step S2302, the contents data are encrypted based on this media key. As the specified method for encryption, the method in accordance with the above explanation made with reference to FIGS. 7 to 11 may be used. The encrypted contents data are recorded on the recording medium. At this time, the version (generation t) of the KRB used for generating the encrypted contents is also recorded on the recording medium. Similarly to the recording generation number or the title key, shown in FIG. 7, the KRB version (generation) may be recorded in a data management file in which there is stored the information pertinent to which data constitutes which title. By the above processing, the encrypted contents data and the KRB information necessary for reproducing the information may be recorded on the recording medium.

Meanwhile, in the encryption of contents and storage of the encrypted contents on the recording medium, encryption and storage of the contents by a newer key may be promoted by detecting the latest available key renewal block (KRB) from the key renewal blocks (KRBs) stored on the recording medium or in the memory of the recording and/or reproducing device itself and by encrypting the data to be stored in the recording medium using the encryption key obtained on decrypting the latest detected available key renewal block (KRB).

Figure 24:
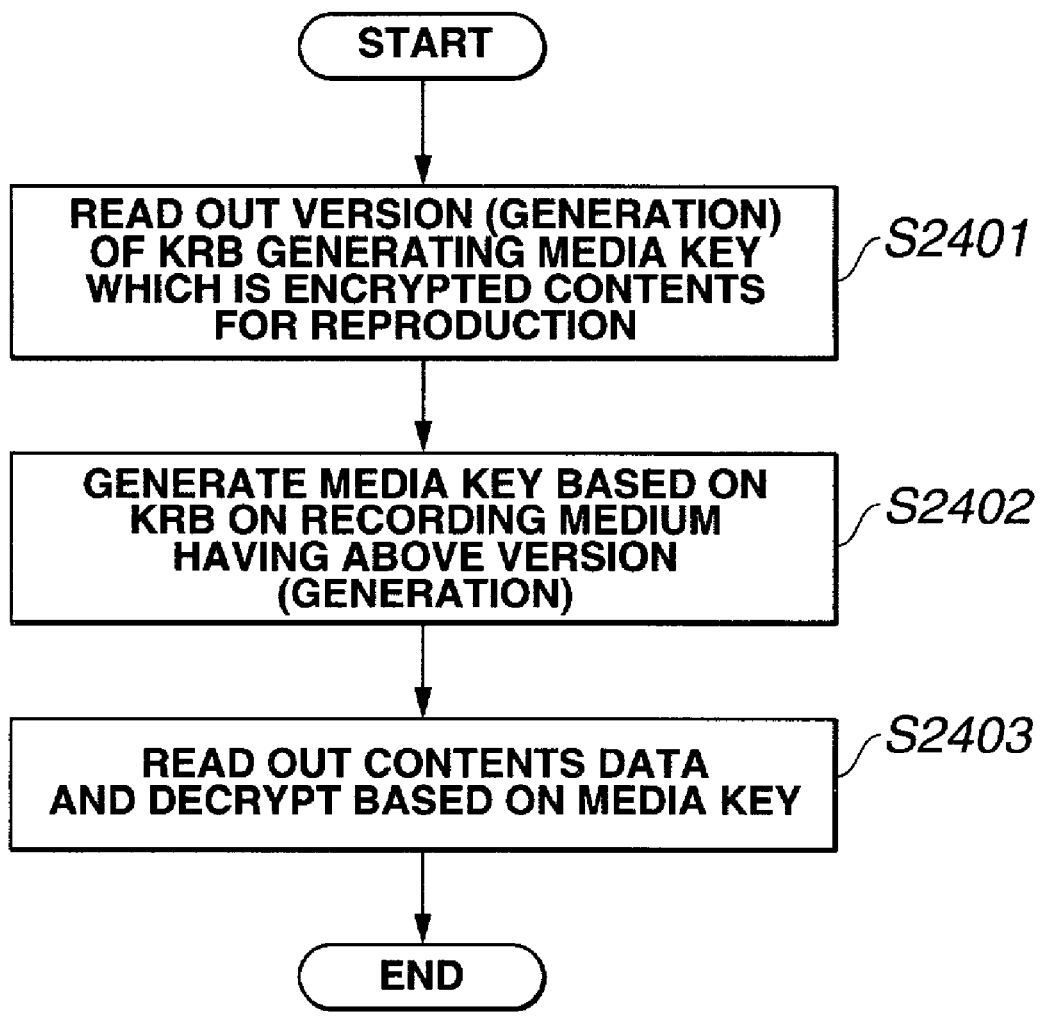
FIG. 24 is a flow diagram for illustrating the processing of decryption by a key acquired using the key renewal block (KRB) and the processing of reproducing the content in the recording and/or reproducing device according to the present invention.

The processing of reading out the contents data, recorded as described above, from the recording medium by the recording and/or reproducing device, is now explained with reference to the flowchart of FIG. 24.

At step S2401, the recording and/or reproducing device reads out the version (generation) of the KRB generating a media key which has encrypted contents data to be reproduced. The version (generation) of the KRB corresponding to the respective contents data on the recording medium is written in, for example, the aforementioned data management file.

At step S2402, the recording and/or reproducing device finds out such a one of the KRBs stored on the recording medium and which has the aforementioned version number (generation t) and, using this KRB, generates a media key in accordance with the procedure explained with reference to FIG. 6.

The recording and/or reproducing device at step S2403 reads out the contents data from the recording medium and decrypts the data so read out based on the media key generated as described above.

Meanwhile, in the processing for decrypting the cipher data stored on the recording medium, it is also possible to detect not only the key renewal block (KRB) stored in the memory of the recording and/or reproducing device itself, but also the key renewal block (KRB) stored in the memory of the recording and/or reproducing device itself and which has the version number coincident with that of the encrypting key for the contents being reproduced, and to decrypt the cipher data stored in the recording medium using the encrypting key obtained by decrypting the detected key renewal block (KRB).

Thus, with the set of information recording and/or reproducing devices, according to the present invention, keys of plural generations or versions can be stored in a recording medium in an environment where plural key renewal blocks (KRBs) with different generations, that is versions, are used together. Moreover, when the recording and/or reproducing device accesses a recording medium, a newer key is stored on the recording medium, while the latest KRB is stored from the recording medium in the memory of the recording and/or reproducing device itself, and any unneeded key is deleted from the recording medium.

A recording and/or reproducing device having a KRB newer than any KRB stored in the recording medium is able to record the new KRB on a recording medium even in case of not recording contents data, so that the speed of migration of the new KRB can be increased. By this processing, new recording media may be stored in the recording and/or reproducing device one after another and, in recording the data, the data are encrypted and recorded using media keys calculated by the latest KRB stored then in the recording and/or reproducing device and in the recording medium, so that, even granting that the recording medium was produced at a remote past time point, with the KRB pre-stored on the recording medium being extremely old, or the KRB stored in the recording and/or reproducing device is also old, the probability is high that a new KRB be used at data recording time, thus assuring higher data security. So, the configuration of the present invention provides a recording system in which it is effectively possible to prevent illicit duplication of data protected by copyright, such as motion pictures or music (that is duplication against the intention of a copyright owner of such data). Moreover, since the present invention provides a configuration in which any unneeded KRB, that is any KRB not used for encrypting the contents data and which is not the latest one of the LRBs stored on the recording medium, is deleted from the recording medium, it is possible to save the recording capacity of the recording medium.

In the above-described embodiment, the explanation has been made mainly in connection with the instance of using the media key as the encrypting key. Alternatively, the encrypting key renewed by the KRB may also be a master key common to plural information recording devices. The key renewal by the KRB may also be applied to a master key or a device key in the same way as a media key.

In the above-described embodiment, the key renewal block (KRB) is renewed when accessing e.g., the TOC (table-of-contents) of the recording medium at a time point of loading the recording medium 1920 on the recording and/or reproducing device 1910. The key renewal block (KRB) may also be renewed when accessing the recording medium at a time point of recording or reproduction.

It should be noted that, for protecting the benefit of the copyright owner of contents, it is up to a licenced device to control the copying of the contents.

That is, for recording the contents on the recording medium, it is necessary to check whether or not the contents is allowed for copying and to record only the contents that is allowed for copying. When the contents recorded on the recording medium are reproduced and output, it is necessary to evade illicit copying of the output contents at a later time.

The processing of the recording and/or reproducing device of FIG. 1 in which the contents recorded or reproduced as control is managed as to the copying of the contents is explained with reference to the flowchart of FIGS. 25 and 26.

Figure 25B:
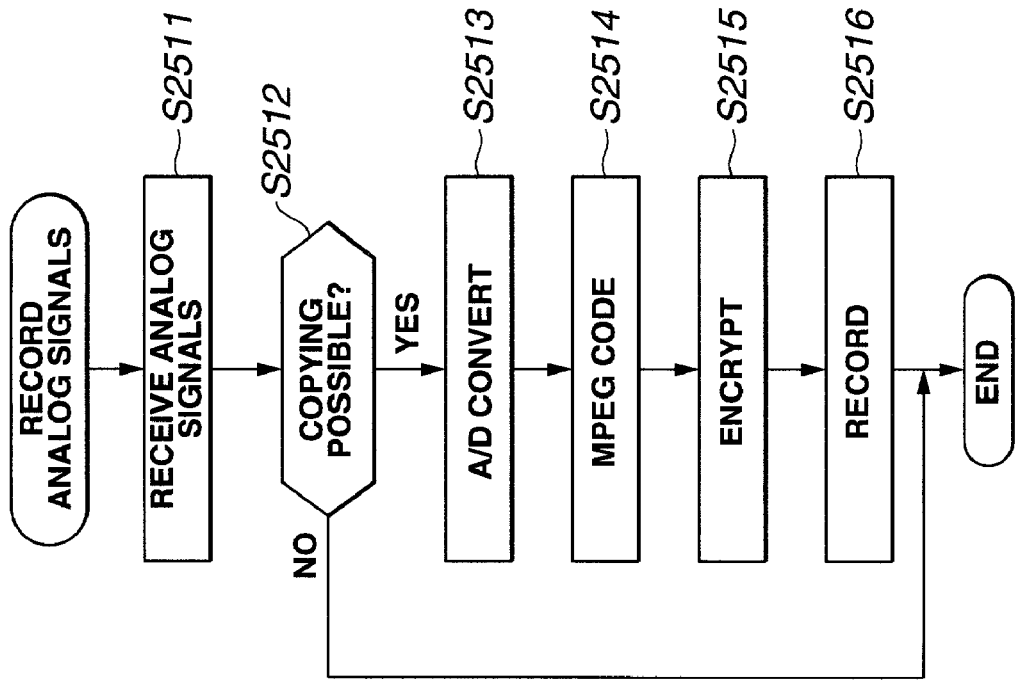
FIGS. 25A and 25B are flowcharts for illustrating the data recording processing and the copying controlling processing in the recording and/or reproducing device according to the present invention.
Figure 25A:
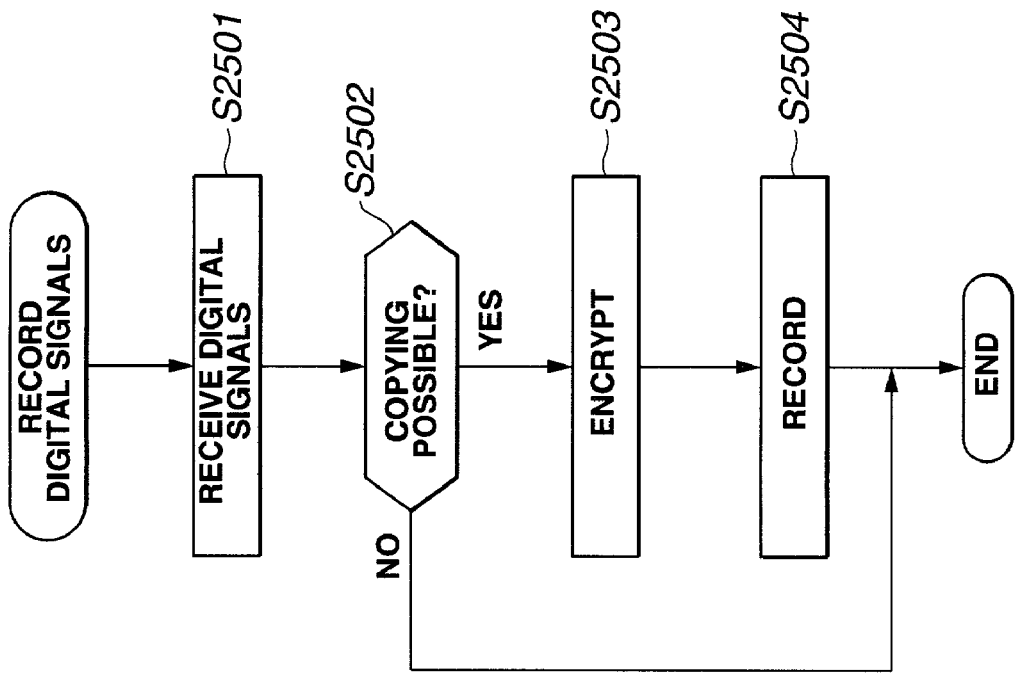

First, in recording the contents of digital signals from outside on a recording medium, the recording processing in accordance with the flowchart of FIG. 25A takes place. Here, the recording and/or reproducing unit 100 shown in FIG. 1 is explained by way of an example. When the contents of digital signals, (digital contents) are fed over e.g., a, IEEE1394 serial bus to an input output I/F 120, the input output I/F 120 receives the digital contents at S2501. The program then moves to step S2502.

At step S2502, the input output I/F 120 verifies whether or not the digital contents received is allowed for copying. That is, if the contents received by the input output I/F 120 are not encrypted, (as when the plaintext contents are fed to the input output I/F 120 without using the above-mentioned DTCP), the contents are verified to be allowed for copying.

It is assumed that the recording and/or reproducing device 100 conforms to DTCP and executes the processing in accordance with the DTCP. The DTCP provides for 2-bit EMI (Encryption Mode Indicator) as the copying controlling information for controlling the copying. If EMI is 00B, B indicating that a value lying ahead of it is a binary number, the EMI indicates that the contents are Copy-freely, whereas, if EMI is 01B, it indicates that the contents are not allowed for further copying (No-more-copies). If the EMI is 10B, it indicates that it is allowed for copying only once (Copy-one-generation), whereas, if the EMI is 11B, it indicates that the contents are inhibited for copying (Copy-never).

If the EMI is included in a signal supplied to a signal sent to the input output I/F 100, and the EMI is Copy-freely or Copy-one-generation, the contents are verified to be allowed for copying. If the EMI is No-more copies or Copy-never, the contents are verified to be not allowed for copying.

If the contents are verified at step S2502 to be not allowed for copying, the steps S2503 to S2504 are skipped to finish the recording processing. So, the contents are not recorded in this case on the recording medium 10.

If, at step S2502, the contents are determined to be allowed for copying, the program moves to step S2503. The processing similar to that at steps S202 and S203 of FIG. 2A then is carried out at steps S2503 to S2504. That is, the processing of encryption by the encryption processing means 150 is carried out and the resulting encrypted contents are recorded on a recording medium 195 to finish the recording processing.

Meanwhile, the EMI is contained in the digital signals supplied to the input output I/F 120 and, when the digital contents are recorded, the EMI, or the information indicating the copying controlling state, as does the EMI, such as embedded CCI in the DTCP, is also recorded along with the digital contents.

By and large, the information indicating the Copy-one-generation is recorded after conversion into No-more-copies such as not to allow for further copying.

In recording the contents of the analog signals from outside, the recording processing in accordance with the flowchart of FIG. 25B is performed. The processing of FIG. 25b is now explained. When the contents of analog signals (analog contents) are sent to the input output I/F 140, the input/output I/F 140 at step S2511 receives the analog contents and proceeds to step S2512 to verify whether or not the so received analog contents are allowed for copying.

The processing of check at step S2512 is performed based on whether or not a macro-vision signal or a CGMS-A (Copy Generation Management System-Analog) signal is included in the signal received by the input/output I/F 140. That is, the macro-vision signal is such a signal which, if recorded on a video cassette tape of the VHS system, proves a noise. If such signal is included in the signal received by the input/output I/F 140, the analog contents are verified to be not allowed for copying.

Moreover, the CGMS-A signal denotes the CGMS signal used in copying controlling digital signals and which is applied to the copying control of the analog signals. The CGMS-A signal denotes that the contents are Copy-free, Copy-one-generation or Copy-never.

Thus, if the CGMS-A signal is included in the signal received by an input/output I/F 140, and the CGMS-A signal denotes Copy-freely or Copy-one-generation, the analog contents are verified to be allowed for copying. If the CGMS-A signal denotes Copy-never, the analog signals are verified to be not allowed for copying.

If no macro-vision signal nor CGMS-A signal is contained in the input/output I/F 140, the analog signals are verified to be allowed for copying.

If the analog signals are determined at step S2512 not to be allowed for copying, the steps S2513 to S2516 are skipped to terminate the recording processing. Thus, in this case, no contents are recorded on the recording medium 195.

If it is verified at step S2512 that the analog contents are not allowed for copying, the program moves to step S2513. In the steps S2513 to S2516, the processing similar to that at steps S222 to S225 of FIG. 2B is performed, whereby the contents are converted into digital data, MPEG encoded, decrypted and recorded on the recording medium to complete the recording processing.

If, in case the CGMS-A signals are included in the analog signals received by the input/output I/F 140, the analog contents are to be recorded on the recording medium, the CGMS-A signals are also recorded on the recording medium. In this case, the information representing the Copy-one-generation is converted, by and large, into No-more-copies to prohibit further copying and recorded in this form. This, however, is not valid if a rule is adopted in a system which states: "The Copy-one-generation copy control information is recorded without conversion to No-more-copies, but is handled as No-more copies".

If the contents recorded on a recording medium are reproduced and output as digital contents to outside, the reproducing processing in accordance with the flowchart of FIG. 26A is performed. The processing of FIG. 26A is now explained. First, at steps S2601 and S2602, the processing similar to that at steps S301 and S302 of FIG. 3A is carried out, whereby the encrypted contents read out from the recording medium is decoded by the encryption processing means 150 so that the decrypted digital contents are sent over the bus 10 to the input/output I/F 120.

The input/output I/F 120 at step S2603 checks whether or not the digital contents supplied thereto is allowed for copying subsequently. That is, if, for example, the EMI, or the information indicating the copying controlling state (copying controlling information) as does the EMI, is not contained in the digital contents sent to the input/output I/F 120, the contents are determined to be allowed for copying subsequently.

If the copying controlling information, such as EMI, is contained in the digital contents supplied to the input/output I/F 120, that is if EMI is recorded in accordance with the DTCP standard during contents recording, and the EMI (recorded EMI) is Copy-freely, the contents are determined to be allowed for copying subsequently. If the EMI is No-more copies, the contents are determined not to be allowed for copying subsequently.

By and large, the copying controlling information, such as EMI, as recorded, is not Copy-one-Generation nor Copying-never. The reason is that the EMI of the Copy-one-generation is converted during recording into No-more-copies, whilst the digital contents having the EMI of Copy-never are not recorded on the recording medium. This, however, is not valid if a rule is adopted in a system which states: "The copy-one-generation copy control information is recorded without conversion to No-more-copies, but handled as No-more copies".

If, at step S2603, the contents are determined to be allowed for copying subsequently, the program moves to step S2604 where the input/output I/F 120 outputs the digital contents to outside to terminate the reproducing processing.

If, at step S2603, the contents are found to be allowed for copying subsequently, the program moves to step S2605 where the input/output I/F 120 outputs the digital contents to outside in such a form as to prohibit its subsequent copying, in accordance with the DTCP standard, to terminate the reproducing processing.

That is, if, for example, the copying controlling information, such as recorded EMI, is No-more copies, or if in a given system, there is set a rule running: "the Copy-one-generation copy controlling information is recorded without conversion to No-more-copies but is treated as No-more copies" and the EMI recorded under this condition is Copy-one-generation, the contents are not allowed for further copying.

So, the input/output I/F 120 effects reciprocal authentication with respect to counterpart devices, in accordance with the DTCP standards. If the counterpart is an authentic device, herein the device conforming to the DTCP standard, the digital contents are encrypted and output in this form to outside.

If the contents recorded on the recording medium are reproduced and output to outside as analog contents, the reproduction processing conforming to the flowchart of FIG. 26B is performed. The processing of FIG. 26B is now explained. In steps S2611 to S2614, the processing similar to that at steps S321 to S324 of FIG. 3B is performed. That is, the readout, decryption, MPEG decoding and D/A conversion of the encrypted contents are carried out. The resulting analog contents are received by the input/output I/F 140.

At step S2615, the input/output I/F 140 is verified as to whether or not the contents supplied thereto are enabled for subsequent copying. For example, if the copying controlling information, such as EMI, is not co-recorded in the recorded contents, the contents are determined to be enabled for copying subsequently.

If, during recording of contents, the copying controlling information, such as EMI, is recorded during recording of contents in accordance with, for example, the DTCP standard, and the information is Copy-free, the contents are determined to be enabled for further copying.

On the other hand, if, for example, the copying controlling information, such as recorded EMI, is No-more copies, or if, in a given system, there is set a rule running: "the Copy-one-generation copy controlling information is recorded without conversion to No-more-copies but is treated as No-more copies" and the EMI recorded under this condition is Copy-one-generation, the analog contents are determined to be not allowed for further copying.

For example, if the CGMS-A signals are contained in analog contents supplied to the input/output I/F 140, such that, during the recording of contents, the CGMS-A signals are recorded along with the contents, with the CGMS-A signals being Copy-freely, the analog signals are determined subsequently to be enabled for copying. If the CGMS-A signals are Copy-never, the analog contents are determined to be enabled for copying subsequently.

If, at step S2615, the contents are determined to be enabled for copying subsequently, the program moves to step S2616 where the input/output I/F 140 directly outputs the analog signals, supplied thereto, by way of terminating the reproduction processing.

On the other hand, if, at step S2615, the contents are determined not to be enabled for copying subsequently, the program moves to step S2617 where the input/output I/F 140 outputs the analog contents in a manner of not allowing for subsequent copying to terminate the reproduction processing.

That is, if, for example, the copying controlling information, such as recorded EMI, is No-more copies, or if, in a given system, there is set a rule running: "the Copy-one-generation copy controlling information is recorded without conversion to No-more-copies but is treated as No-more copies" and the copying controlling information, such as EMI, recorded under this condition, is Copy-one-generation, the contents are not allowed for further copying.

So, the input/output I/F 140 appends e.g., macro-vision signals or CGMS-A signals indicating Copy-never to the analog signals to output the resulting signals to outside. If the CGMS-A signals recorded are Copy-never, the contents are not allowed for further copying. So, the input/output I/F 4 outputs the contents to outside, along with analog contents, after converting the CGMS-A signals to Copy-never.

By recording or reproducing contents as the contents are controlled for copying, as described above, it is possible to prevent the copying outside the range allowed for the contents (illicit copying).

Figure 27:
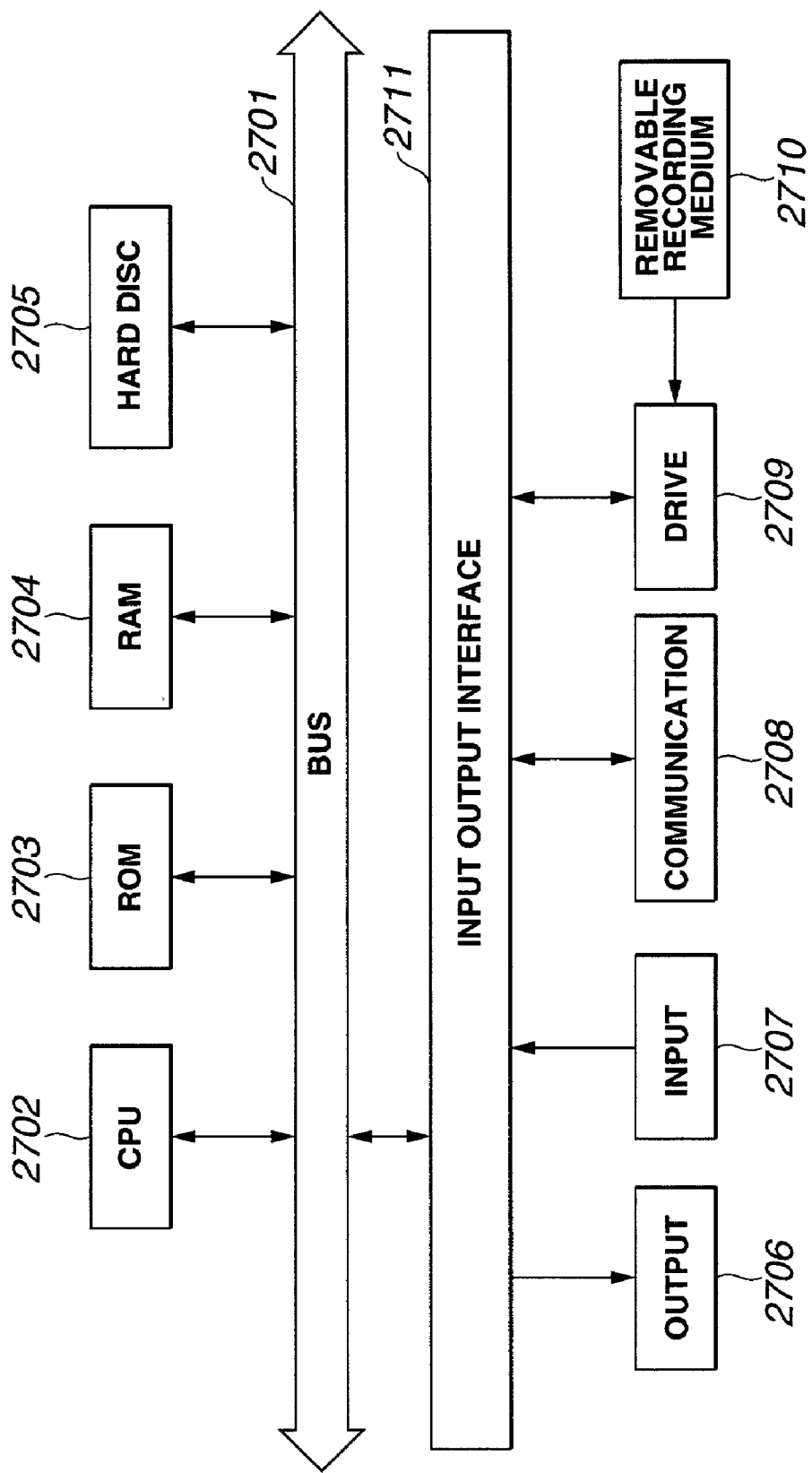
FIG. 27 is a block diagram showing the structure of processing means in executing the data processing by a software in the recording and/or reproducing device according to the present invention.

The above-described sequence of operations may be performed not only by hardware but also by software. For example, although the encryption processing means 150 may be arranged as encrypting/decrypting LSI, it may also be arranged by a configuration in which the program is executed by a general-purpose computer or a one-chip micro-computer. If this sequence of processing operations are executed by software, the program forming the software is installed on a general-purpose computer or a one-chip micro-computer. FIG. 27 shows an illustrative structure of an embodiment of a computer on which is installed the program executing the above-described sequence of operations.

The program may be pre-recorded on the hard disc 2705 or on the ROM 2703 as a recording medium built into a computer. Alternatively, the program may be transiently or permanently stored (recorded) in a removable recording medium 2710, such as a floppy disc, CD-ROM (compact disc read only memory), MO (magneto optical) disc, DVD (digital versatile disc), a magnetic disc or on a semiconductor memory. Such removable recording medium 2710 may also be furnished as a so-called package software.

Meanwhile, the program may be installed on a computer from the above-mentioned removable recording medium 2710, transmitted over a radio path to the computer from a downloading site via an artificial satellite for digital satellite broadcasting, or transmitted to the computer over a cable through the networks, such as Internet. The computer is able to receive the so transferred program by a communication unit 2708 to install the program on a built-in hard disc 2705.

The computer has a built-in CPU (central processing unit). To the CPU 2702 is connected an input/output interface 2711, over a bus 2701. If a command is input by a user acting on the input unit 2707, such as a keyboard or a mouse, through the input/output interface 2711, the program stored in the ROM (read-only memory) 2703 is executed accordingly.

Alternatively, the CPU 2702 loads a program, stored in the hard disc 2705, a program transferred from a satellite or a network, received by a communication unit 2708 and installed on the hard disc 2705, or a program read out from the removable recording medium 2110 loaded on a drive 2709 so as to be installed on the hard disc 2705, on the RAM (random access memory) 2704, for execution.

Thus, the CPU 2702 performs the processing conforming to the above-described flowchart, or in accordance with the configuration of the block diagram described above. The CPU 2702 outputs the processed results via e.g., input/output interface 2711 from an output unit 2706 formed e.g., by an LCD (liquid crystal display) or a loudspeaker, for transmission from the communication unit 2708 or recording on the hard disc 2705.

It should be noted that, in the present specification, the processing steps stating the program designed for the computer to carry out a variety of processing operations are not necessarily processed chronologically in a sequence stated in the flowchart, but the processing also may include processing carried out in parallel or batch-wise, such as parallel processing or processing by an object.

The program may be processed by one computer or by a plural number of computers in a distributed fashion. The program may also be transferred to and executed by a remote computer.

In the present embodiment, the description has been made mainly on an instance in which the block for encrypting/decrypting the contents is formed by a one-chip encrypting/decrypting LSI. However, the contents encrypting/decrypting block may also be realized by one software module executed by the CPU 170 shown in FIG. 1.

The present invention has so far been elucidated with reference to certain preferred embodiments. It is however apparent that the present invention can be modified by the skilled artisan by correction or substitution of the embodiments within the scope not departing from the purport of the invention. That is, the present invention has been disclosed in the perspective of illustration and hence the scope of the present invention should be defined in light of the claims without being construed in a limiting fashion.

INDUSTRIAL APPLICABILITY

In the system of the information recording and/or reproducing devices, according to the present invention, the key renewal blocks (KRBs) having plural different generations and versions can be stored on the recording medium, while the latest key renewal block (KRB) can be taken out and stored in a memory in the recording and/or reproducing device. In the processing of storing contents on a recording medium, the latest usable one of a plural number of KRBs stored in the memory of the recording and/or reproducing device and on the recording medium is detected, and an encryption key, such as a media key, is acquired from the latest KRB. Using the so acquired latest media key, the contents are encrypted and newly stored on the recording medium. The key renewal block (KRB) which has acquired e.g., the media key used for encrypting the contents is newly stored on the recording medium. So, in newly recording the contents on the recording medium, encryption is performed using the media key calculated based on a newer KRB.

Thus, if the KRB of the old version used in contents encryption at the time of manufacture of the recording medium has been recorded on the recording medium, the KRB of a newer version, issued as the illicit equipment is revoked, whereby the encrypted contents acquired from the KRB of the new version that can be acquired solely by the authorized equipment can subsequently be stored in the recording medium, thus enabling the elimination of decryption and reproduction by the revoked equipment.

In the system of the information recording and/or reproducing devices, according to the present invention, progressively new recording media may be stored in the recording and/or reproducing device one after another and, in recording the data, the data are encrypted and recorded using media keys calculated by the latest KRB stored then in the recording and/or reproducing device and in the recording medium, so that, even granting that the recording medium was produced at a remote past time point, with the KRB pre-stored on the recording medium being extremely old, the probability is high that a new KRB is used at data recording time, so that the contents may be encrypted using an encrypting key of a newer version. So, the configuration of the present invention provides a recording system in which it is effectively possible to prevent illicit duplication and propagation of data protected by copyright, such as motion pictures or music, for example, duplication against the intention of a copyright owner.

With the system of the information recording and/or reproducing devices, according to the present invention, as described above, the keys of plural generations and different versions can be stored on the recording medium, such that, when the device accesses the recording medium, a newer key may be stored on the recording medium, a newer KRB may be stored from the recording medium to the memory of the recording and/or reproducing device itself and moreover an unneeded key is deleted from the recording medium. The recording and/or reproducing device having a KRB newer than any KRB stored on the recording medium is able to record the new KRB on the recording medium even if contents data is not recorded.

So, the speed of migration of new KRB is increased such that progressively new KRBs are stored on the recording and/or reproducing device. Moreover, in data recording, data is encrypted and recorded using the media key calculated by the latest KRB stored on the recording medium or in the recording and/or reproducing device. Thus, even if the recording medium was produced at a remote past time point, with the KRB pre-stored on the recording median being extremely old, or the KRB stored in the recording and/or reproducing device is also old, the probability is high that a new KRB is used at data recording time, thus assuring higher security of the encrypted data.

Therefore, with the configuration of the present invention, such a recording system may be constructed in which the illicit duplication (duplication against the intention of the copyright owner) of data protected by copyright, such as motion pictures or music, may be prohibited effectively. Moreover, unneeded KRBs on the recording medium, that is the KRBs not used for encrypting the contents data and which are not the latest one of the KRBs on the recording medium, are erased from the recording medium, thus saving the recording capacity of the recording medium.

The invention claimed is:

1. An information recording device for recording the information on a recording medium, comprising:
    memory means for holding a node key unique to each node of a hierarchical tree structure having a plural number of such information recording devices, operating as leaves, and a leaf key unique to each information recording device, said memory means also holding a key renewal block formed as renewal key storage data decryptable using at least one of the node key and the leaf key; and
    encryption means for decrypting the key renewal block decryptable using at least one of the node key and the leaf key provided in said information recording device to calculate an encrypting key used in encrypting data to be stored in said recording medium; said encryption means encrypting the data to be stored in said recording medium using the calculated encrypting key;
    said encryption means detecting, in encrypting and storing content for said recording medium, the latest usable key renewal block from key renewal blocks stored in said recording medium and from the key renewal block stored in said memory means of the information recording device itself; said encryption means encrypting the data to be stored on said recording medium using the encrypting key obtained on decrypting the detected latest usable key renewal block,
    wherein said information recording device executes processing of writing the latest usable one of the key renewal blocks stored on said recording medium and the key renewal block stored in the memory means of the information recording device itself, in the memory means of the information recording device itself, in case the latest usable key renewal block is the key renewal block stored in the recording medium and the latest key renewal block is not as yet stored in the memory means of the information recording device itself,
    and wherein said information recording device executes the processing of writing the latest usable one of the key renewal blocks stored on said recording medium and the key renewal block stored in the memory means of the information recording device itself on the recording medium in case the latest usable key renewal block is the key renewal block stored in the memory means of the information recording device itself and the latest key renewal block is not as yet stored on the recording medium.

2. The information recording device according to claim 1 wherein said encrypting key is one of a master key common to the plural information recording devices, a device key unique to each information recording device and a media key set so as to be unique to each information recording device.

3. The information recording device according to claim 1 wherein said node key is configured as a renewable key and, in a renewal processing of said encrypting key, a key renewal block encrypted using a key including at least a lower layer node key or a lower layer leaf key is distributed to an information recording device as a leaf to be supplied with said encrypting key;

said encryption means in said information recording device receiving the encrypting key encrypted with said renewal node key;

acquiring said renewal node key by encryption processing of said key renewal block; and calculating said encrypting key based on the acquired renewal node key.

4. The information recording device according to claim 1 wherein said encrypting key is associated with a version number as the generation information.

5. An information reproducing device for reproducing the information from a recording medium, comprising:

memory means for holding a node key unique to each node of a hierarchical tree structure having a plural number of such information reproducing devices operating as leaves, and a leaf key unique to each information reproducing device, said memory means also holding key renewal blocks each formed as renewal key storage data decryptable using at least one of the node key and the leaf key;

encryption means for decrypting the key renewal block decryptable using at least one of the node key and the leaf key provided in said information reproducing device to calculate an encrypting key used for decrypting cipher data stored in said recording medium; said encryption means decrypting the cipher data stored in said recording medium using the calculated encryption key;

said encryption means detecting, in processing of decrypting the cipher data stored in said recording medium, a latest one of the key renewal block stored in the recording medium and the key renewal block stored in the memory means of the reproducing device itself, which has a version coincident with the version of the encrypting key of the content to be reproduced; said encryption means executing the decrypting processing of the cipher data stored on the recording medium using the encrypting key obtained by the processing of decrypting the detected key renewal block; and renewal means for comparing, in accessing the recording medium, a version of a key renewal block stored in the recording medium to that of a key renewal block owned by the reproducing device itself, and for writing a key renewal block of a new version in the recording medium, if the key renewal block of the new version is the key renewal block stored in the memory means of the reproducing device itself, and the key renewal block of the new version is not as yet stored on the recording medium.

6. The information reproducing device according to claim 5 wherein said encrypting key is one of a master key common to the plural information reproducing devices, a device key unique to the information reproducing device and a media key set so as to be unique to each information reproducing device.

7. The information reproducing device according to claim 6 wherein said information reproducing device is configured for executing the processing of writing the latest usable one of the key renewal blocks stored on said recording medium and the key renewal block stored in the memory means of the information reproducing device itself, in case the latest usable key renewal block is the key renewal block stored in the recording medium and the latest key renewal block is not as yet stored in the memory means of the reproducing device itself.

8. The information reproducing device according to claim 5 wherein said node key is configured as a renewable key and, in a renewal processing of said encrypting key, a key renewal block obtained on encrypting a renewal node key using a key including at least a lower layer node key or a lower layer leaf key is distributed to an information reproducing device as a leaf to be supplied with said encrypting key;

said encryption means in said information reproducing device receiving the encrypting key encrypted with said renewal node key;

acquiring said renewal node key by encryption processing of the key renewal block; and calculating said encrypting key based on the acquired renewal node key.

9. The information reproducing device according to claim 5 wherein said encrypting key is associated with a version number as generation information.

10. An information recording method in an information recording device adapted for recording the information for a recording medium, said information recording device holding a node key unique to each node of a hierarchical tree structure having a plural number of such information recording devices, operating as leaves, and a leaf key unique to each information recording device, said method comprising:

a step of detecting a latest usable one of key renewal blocks stored in the recording medium and the key renewal block stored in said memory means of the information recording device itself;

a step of decrypting the detected latest usable key renewal block, at said detection step, using at least the node key or the leaf key held in said information recording device, to calculate the encrypting key used in encrypting data stored in said recording medium; and a step of encrypting recording data for said recording medium, using the calculated encrypting key, to store the encrypted data on the recording mediums, wherein, in case the detected latest usable key renewal block is the key renewal block stored in the recording medium and the latest key renewal block has as yet not been stored in the memory means of the information recording device itself, said detection step executes the processing of writing the latest key renewal block in said memory means of the information recording device itself, and wherein, in case the detected latest usable key renewal block is the key renewal block stored in the memory means of the information recording device itself and the latest key renewal block has as yet not been stored in the recording medium, said detection step executes processing of writing the latest key renewal block in said recording medium.

11. An information reproducing method in an information recording device adapted for recording the information for a recording medium, each of a plurality of such devices holding a node key unique to each node of a hierarchical tree structure having the plural respective information recording devices operating as leaves, and a leaf key unique to each information recording device, said method comprising:

a step of acquiring the version information of an encrypting key for the content being reproduced, stored in a recording medium;

a step of detecting the one of the key renewal block stored in the recording medium and the key renewal block stored in a memory means of the reproducing device itself, which has a version coincident with the version of the encrypting key of the content to be reproduced;

a step of generating an encrypting key using at least one of the node key and the leaf key by decryption processing of a key renewal block as detected by said detection step;

a step of decrypting the cipher data stored in the recording medium using the generated encrypting key; and a step of comparing, in accessing the recording medium, a version of a key renewal block stored in the recording medium to that of a key renewal block owned by the reproducing device itself, and for writing a key renewal block of a new version in the recording medium, if the key renewal block of the new version is the key renewal block stored in the memory means of the reproducing device itself, and the key renewal block of the new version is not as yet stored on the recording medium.

12. The information reproducing method according to claim 11 wherein said step of detecting executes processing of writing a latest usable one of the renewal blocks in the memory means of the information recording device itself, in case the latest usable key renewal block is the key renewal block stored in the recording medium and the latest key renewal block is not as yet stored in the memory means of the information recording device itself.

13. An information recording device for recording the information on a recording medium, each recording device comprising:

memory means for holding a node key unique to each node of a hierarchical tree structure having a plural number of such information recording devices operating as leaves and a leaf key unique to each information recording device, said memory means also holding a key renewal block each formed as renewal key storage data decryptable using at least one of the node key and the leaf key;

encryption means for decrypting the key renewal block formed as renewal key storage data decryptable using at least one of the node key and the leaf key provided in said information recording device to calculate an encrypting key used in encrypting the data to be stored in said recording medium; said encryption means encrypting the data stored in said recording medium using the calculated encrypting key; and renewing means for comparing, in accessing the recording medium, a version of a key renewal block stored in the recording medium to that of the key renewal block owned by the information recording device itself, and for writing a key renewal block of a new version on the recording medium if the key renewal block of the new version is the key renewal block stored in the memory means of the recording device itself, and the key renewal block of the new version is not as yet stored on the recording mediums, wherein, if a latest usable one of the key renewal blocks is the key renewal block stored on the recording medium and the latest usable key renewal block has not as yet been recorded in the memory means of the recording device itself, said renewing means writes the latest key renewal block in the memory means of the recording device itself.

14. The information recording device according to claim 13 wherein said renewing means detects such a one of key renewal blocks stored on a recording medium, not used for encrypting any content data stored on said recording medium and which is not a latest one on the recording medium, and deletes the detected key renewal block from the recording medium.

15. The information recording device according to claim 13 wherein, in encryption and storage processing of content for said recording medium, said encryption means detects a latest usable one of the key renewal blocks stored in the recording medium and the key renewal block stored in the memory means of the information recording device itself and, using the encryption key acquired by decryption processing of the detected latest usable key renewal block, undertakes to encrypt the data to be stored in said recording medium.

16. The information recording device according to claim 13 wherein said encrypting key is one of a master key common to the plural information recording devices, a device key unique to each information recording device and a media key set so as to be unique to each information recording device.

17. The information recording device according to claim 13 wherein said node key is configured as a renewable key and, in renewing the encrypting key, a key renewal block obtained on encrypting a renewal node key by a key at least including one of a node key of a lower layer and a leaf key of a lower layer is distributed to the information recording device of the leaf intended to be furnished with the encrypting key;

said encryption means in said information recording device receiving the encrypting key encrypted using the renewal node key; and acquiring said renewal node key to calculate said encrypting key based on the acquired renewal node key.

18. The information recording device according to claim 13 wherein said encrypting key is associated with a version number as generation information.

19. An information reproducing device for reproducing the information from a recording medium, each information reproducing device comprising:

memory means for holding a node key unique to each node of a hierarchical tree structure having a plural number of such information reproducing devices operating as leaves and a leaf key unique to each information reproducing device, said memory means also holding a key renewal block formed as renewal key storage data decryptable using at least one of the node key and the leaf key;

encryption means for decrypting the key renewal block decryptable using at least one of the node key and the leaf key provided in each information reproducing device to calculate an encrypting key used in encrypting data to be stored in said recording medium; said encryption means decrypting the data stored in said recording medium using the calculated encrypting key; and renewal means for comparing, in accessing the recording medium, a version of a key renewal block stored in the recording medium to that of the key renewal block owned by the reproducing device itself, and for writing a key renewal block of a new version in the recording medium, if the key renewal block of the new version is the key renewal block stored in the memory means of the reproducing device itself, and the key renewal block of the new version is not as yet stored on the recording medium.

20. The information reproducing device according to claim 19 wherein, if a latest usable one of key renewal blocks stored on the recording medium and the key renewal block owned by the information reproducing device itself is the key renewal block stored on the recording medium, and that latest key renewal block has as yet not been stored in the memory means of the information reproducing device itself, said renewing means writes that latest key renewal block in the memory means of the information reproducing device itself.

21. The information reproducing devices according to claim 19 wherein said renewal means detects such a one of the key renewal blocks stored in the recording medium, not used in encrypting any content data stored on said recording medium and which is not a latest one on the recording medium, and deletes the detected key renewal block from the recording medium.

22. The information reproducing devices according to claim 21 wherein said encryption means detects, in processing of decrypting cipher data stored in said recording medium, one of the key renewal blocks which is stored in the recording medium and the key renewal block stored in the reproducing device itself, and which has a version coincident with a version of the encrypting key of content to be reproduced; said encryption means executing the decrypting processing of the cipher data stored on the recording medium using the encrypting key obtained by the processing of decrypting the detected key renewal block.

23. The information reproducing devices according to claim 21 wherein said encrypting key is one of a master key common to the plural information reproducing devices, a device key unique to each information reproducing device and a media key set so as to be unique to each information reproducing device.

24. The information reproducing device according to claim 21 wherein said node key is configured as a renewable key and, in renewing the encrypting key, a key renewal block obtained on encrypting a renewal node key by a key at least including one of a node key of a lower layer and a leaf key of a lower layer is distributed to an information recording device of the leaf intended to be furnished with the encrypting key;

said encryption means in said information reproducing device receiving the encrypting key encrypted using the renewal node key and acquiring said renewal node key by encrypting the key renewal block to calculate said encrypting key based on the acquired renewal node key.

25. The information reproducing device according to claim 21 wherein said encrypting key is associated with a version number as generation information.

26. In a recording or reproducing device including a node key unique to each node forming a hierarchical tree structure having a plural number of such information recording or reproducing devices, operating as leaves, and a leaf key unique to each recording or reproducing device, said device being adapted for recording the information on a recording medium, a method for renewing an encrypting key comprising:

a detection step of detecting a latest usable one of key renewal blocks stored on the recording medium and a key renewal block stored in a memory means of the recording or reproducing device; and a renewal step of undertaking, in case a latest version of the key renewal block is the key renewal block stored in the memory means of the information recording or reproducing device itself and the key renewal block of a new version has not been stored on the recording medium, the writing of said key renewal block of the new version on said recording mediums, wherein said renewing step further includes a step of undertaking, in case the latest usable one of the key renewal blocks stored on said recording medium and the key block owned by the information recording or reproducing device itself is the key renewal block stored on said recording medium, and the latest key renewal block has as yet not been stored in the memory means of the information recording or reproducing device, including a processing of writing said latest key renewal block in the memory the recording and/or reproducing device itself, and wherein the latest usable key renewal block is decryptable using at least one of the node key and the leaf key to determine the encryption key.

27. The encrypting key renewing method according to claim 26 wherein said renewing step further includes a step of detecting such a one of the key renewal blocks stored in the recording medium, not used in detecting any content data stored on said recording medium and which is not a latest key renewal block on the recording medium, said renewing step also deleting the detected key renewal block from the recording medium.

* * * * *